(12) United States Patent
Noh et al.

(10) Patent No.: US 11,595,505 B2
(45) Date of Patent: Feb. 28, 2023

(54) MOBILE TERMINAL AND CONTROL METHOD THEREFOR

(71) Applicant: LG ELECTRONICS INC., Seoul (KR)

(72) Inventors: Kensin Noh, Seoul (KR); Dongwan Kang, Seoul (KR); Seungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/021,996

(22) Filed: Sep. 15, 2020

(65) Prior Publication Data

US 2021/0337049 A1    Oct. 28, 2021

(30) Foreign Application Priority Data

Apr. 27, 2020  (WO) ................ PCT/KR2020/005527

(51) Int. Cl.
| | |
|---|---|
| H04M 1/02 | (2006.01) |
| H04M 1/72454 | (2021.01) |
| G06F 3/04817 | (2022.01) |
| G06F 3/04845 | (2022.01) |
| G06F 3/0488 | (2022.01) |

(52) U.S. Cl.
CPC ........ *H04M 1/0241* (2013.01); *G06F 3/0488* (2013.01); *G06F 3/04817* (2013.01); *G06F 3/04845* (2013.01); *H04M 1/0237* (2013.01); *H04M 1/0268* (2013.01); *H04M 1/72454* (2021.01); *G06F 2203/04803* (2013.01); *H04M 1/0264* (2013.01); *H04M 2250/12* (2013.01)

(58) Field of Classification Search
CPC .................................................. H04M 1/0241
See application file for complete search history.

(56) References Cited

U.S. PATENT DOCUMENTS

| | | | |
|---|---|---|---|
| 9,940,660 B2 * | 4/2018 | Goulart | G06Q 30/0641 |
| 10,708,395 B1 * | 7/2020 | Han | H05K 5/0217 |
| 2005/0176470 A1 | 8/2005 | Yamakawa | |
| 2008/0318633 A1 | 12/2008 | Wong et al. | |

(Continued)

FOREIGN PATENT DOCUMENTS

| | | | |
|---|---|---|---|
| CN | 104881266 A | * | 9/2015 |
| EP | 1642253 | | 4/2006 |

(Continued)

OTHER PUBLICATIONS

PCT International Application No. PCT/KR2020/005527, International Search Report dated Jan. 22, 2021, 9 pages.

(Continued)

*Primary Examiner* — Hsinchun Liao
(74) *Attorney, Agent, or Firm* — Lee, Hong, Degerman, Kang & Waimey PC

(57) ABSTRACT

A mobile terminal and a control method therefor are disclosed. The mobile terminal includes a body, a display coupled to the body to vary a display region viewed from a front of the body according to switching between an enlarged display mode and a reduced display mode, an input unit configured to sense user input, and a controller. The controller controls switching of the display to the enlarged display mode according to first input.

13 Claims, 21 Drawing Sheets

(56) References Cited

U.S. PATENT DOCUMENTS

| | | | |
|---|---|---|---|
| 2014/0201655 A1* | 7/2014 | Mahaffey | G06F 3/04817 715/765 |
| 2016/0378270 A1 | 12/2016 | Lee et al. | |
| 2018/0348881 A1 | 12/2018 | Chung | |
| 2019/0346954 A1 | 11/2019 | Jung et al. | |

FOREIGN PATENT DOCUMENTS

| | | |
|---|---|---|
| EP | 2947538 | 11/2015 |
| EP | 3493042 | 6/2019 |
| KR | 1020100079100 | 7/2010 |
| KR | 1020160123620 | 10/2016 |
| KR | 1020190128843 | 11/2019 |
| WO | 2004114259 | 12/2004 |

OTHER PUBLICATIONS

European Patent Office Application Serial No. 20211283.5, Search Report dated May 18, 2021, 8 pages.

\* cited by examiner (a)

(b)

(a)

(b)

(a)

(b)

(a)

(b)

(c)

(a)          (b)

MOBILE TERMINAL AND CONTROL METHOD THEREFOR

CROSS-REFERENCE TO RELATED APPLICATION(S)

Pursuant to 35 U.S.C. § 119 (a), this application claims the benefit of an earlier filing date and right of priority to International Application No. PCT/KR2020/005527 filed on Apr. 27, 2020, the contents of which are hereby incorporated by reference herein in its entirety.

BACKGROUND

Field

The present disclosure relates to a mobile terminal and a control method therefor. More specifically, the present disclosure relates to a mobile terminal for switching a display to an enlarged display mode according to input, and a control method therefor.

Discussion of the Related Art

Terminals may be generally classified into mobile/portable terminals or stationary terminals according to mobility thereof. Mobile terminals may also be classified into handheld terminals or vehicle mounted terminals according to whether or not a user can directly carry the terminal.

Functions of mobile terminals are diversifying. For example, the functions include data and voice communication, photography and video capture using a camera, voice recording, music file playback through a speaker system, and image or video output on a display. Some terminals additionally have an electronic gaming function or perform multimedia player functions. Recent mobile terminals may receive multicast signals that provide visual content such as broadcast, videos, or television programs.

As functions of such terminals are diversified, the terminals are implemented in the form of a multimedia player equipped with composite functions such as photograph or video capture, music or video file playback, and broadcast reception.

To support and increase the functions of the terminals, improvement of a structural part and/or software part of the terminals may be considered.

Recently, a flexible display having sufficient elasticity and capable of large deformation has been developed. The size of a mobile terminal can be varied using the deformable nature of the flexible display.

In the case in which the size of a front display is changeable, how to arrange content when the flexible display is extended is problematic.

Although the flexible display has been developed up to now, since the flexible display is not available in the market, there are not many embodiments of a content arrangement method when the flexible display is extended.

SUMMARY

An object of the present disclosure is to solve the above problem and other problems.

Another object of the present disclosure is to provide a mobile terminal for switching a display to an enlarged display mode according to input , and a control method therefor.

To achieve these objects and other advantages and in accordance with the purpose of the disclosure, as embodied and broadly described herein, a mobile terminal includes a body, a display coupled to the body to vary a display region viewed from a front of the body according to switching between an enlarged display mode and a reduced display mode, an input unit configured to sense user input, and a controller. The controller controls switching of the display to the enlarged display mode according to first input.

According to an aspect of the present disclosure, the controller may execute a first application according to the first input and control switching of the display to the enlarged display mode based on characteristics of the first application.

According to an aspect of the present disclosure, the characteristics may include user input frequency, and the controller may control output of the first application in a first region of an extended display based on the user input frequency of the first application exceeding a preset value and control output of the first application in a second region of the extended display based on the user input frequency of the first application not exceeding the preset value.

According to an aspect of the present disclosure, the controller may determine a grip method of the user based on a location of the sensed user input and control switching of the display to the enlarged display mode based on the determined grip method of the user.

According to an aspect of the present disclosure, the controller may control output of content in a left region of an extended display based on gripping the mobile terminal with a right hand of the user and on switching of the display to the enlarged display mode.

According to an aspect of the present disclosure, the controller may execute a second application according to second input and determine an output location of the executed second application based on the second input related with touch drag input and on a dragged length of the second input.

According to an aspect of the present disclosure, the controller may control output of a received alarm window on the display and control output of a first mode of a third application corresponding to the alarm window on an extended display upon sensing third input for the alarm window.

According to an aspect of the present disclosure, the controller may end output of the first mode upon sensing fourth input of a first direction for the first mode and control output of a second mode of the third application on the extended display upon sensing fifth input of a second direction for the first mode.

According to an aspect of the present disclosure, the controller may control output of at least one indicator on the display according to sixth input, and the indicator may indicate a layout of content output during switching of the display to the enlarged display mode.

According to an aspect of the present disclosure, the first input may correspond to a preset gesture.

According to an aspect of the present disclosure, the controller may control output of at least one icon in an extended display region based on switching of the display to the enlarged display mode, and the icon may indicate an application having high use frequency.

According to an aspect of the present disclosure, the body may include a first frame and a second frame and the second frame may be extendable or contractible from the first frame.

According to an aspect of the present disclosure, the controller may operate in the enlarged display mode based on extension of the second frame and operate in the reduced display mode based on contraction of the second frame.

According to an aspect of the present disclosure, the display may include a flexible display surrounding the front, a side, and a rear of the body, and the controller may control movement of a display portion positioned on the side of the body to the front of the body and movement of a display portion positioned on the rear of the body to the front of the body via the side of the body, based on extension of the second frame.

According to an aspect of the present disclosure, the controller may control movement of a display portion positioned on the front of the body to the side of the body or to the rear of the body via the side of the body, based on contraction of the second frame.

According to an aspect of the present disclosure, the mobile terminal may further include a driving unit configured to extend or contract the second frame.

According to an aspect of the present disclosure, provided herein is a method of controlling a mobile terminal, including sensing first input through an input unit, executing a first application according to the sensed first input, and switching a display to an enlarged display mode according to characteristics of the first application.

Further scopes of applicability of the present disclosure will become apparent from the following detailed description. However, those skilled in the art may understand that various modifications and changes may be possible within the concept and scope of the present disclosure and the detailed description and specific examples, such as exemplary embodiments of the disclosure, will be given by way of illustration only.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
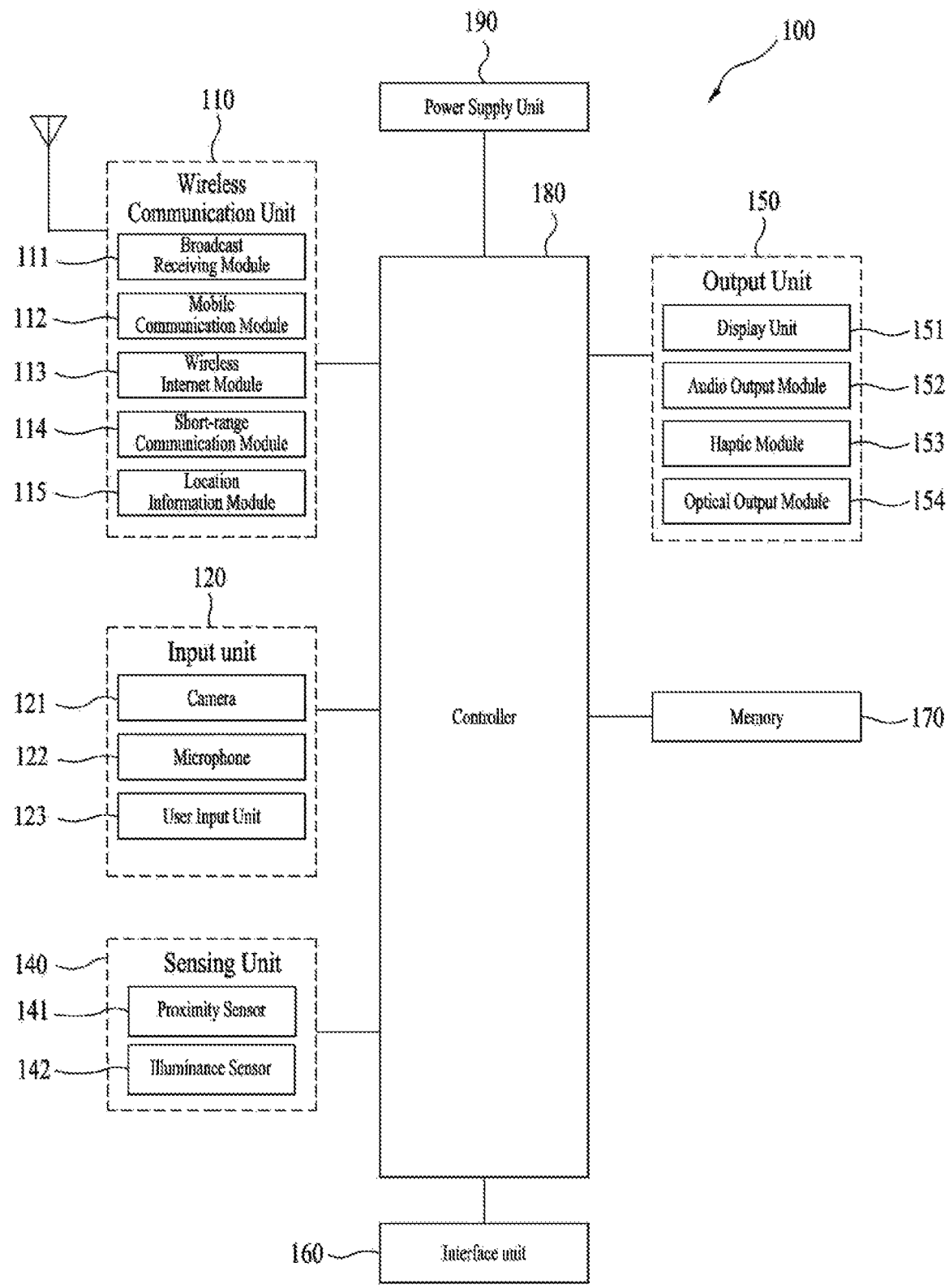
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (USB), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
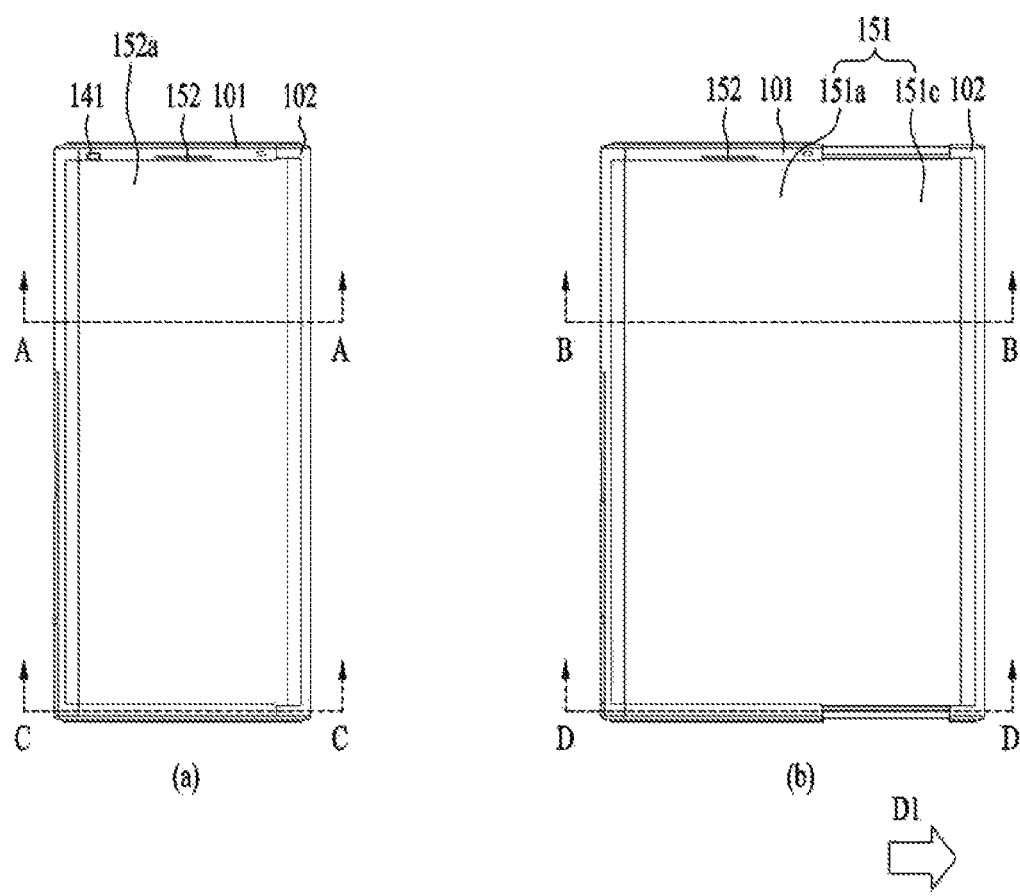
FIG. 2 is a front view of a first state and a second state of the mobile terminal in accordance with an embodiment.
Figure 3:
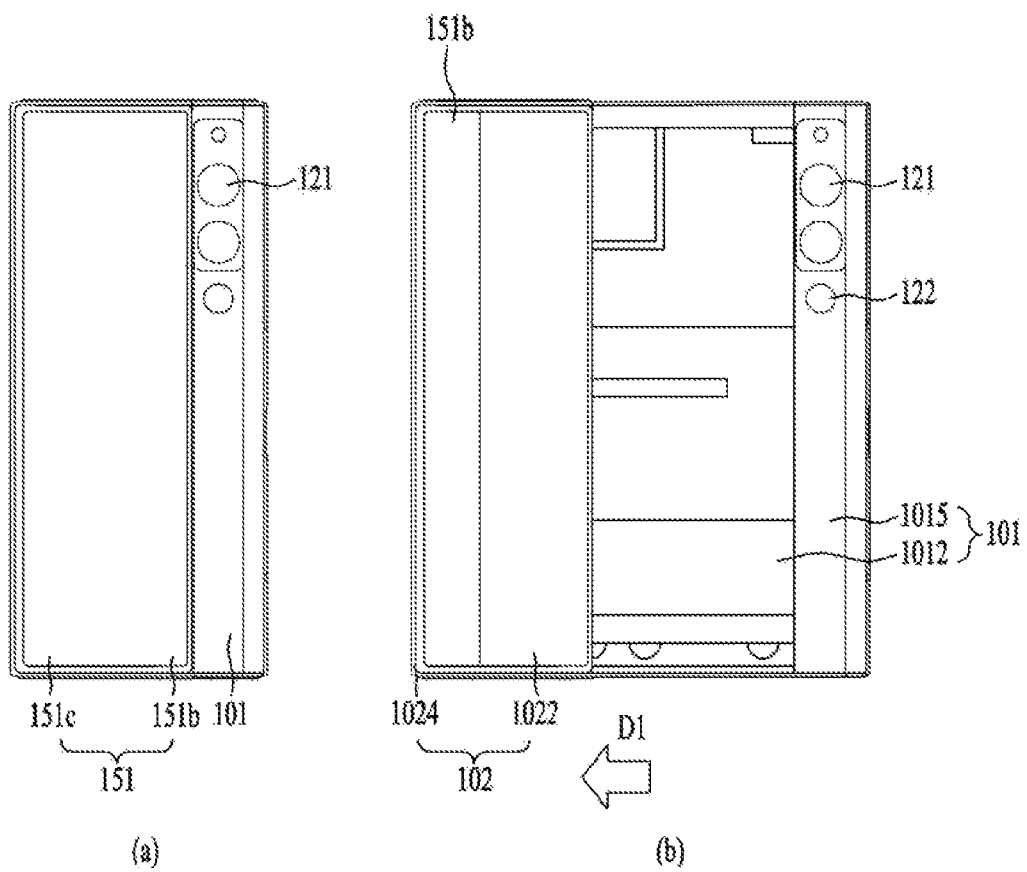
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(*a*) and 3(*a*) are views showing the first state in which the mobile terminal is contracted, and FIGS. 2(*b*) and 3(*b*) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(*b*), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(*b*). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the second frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
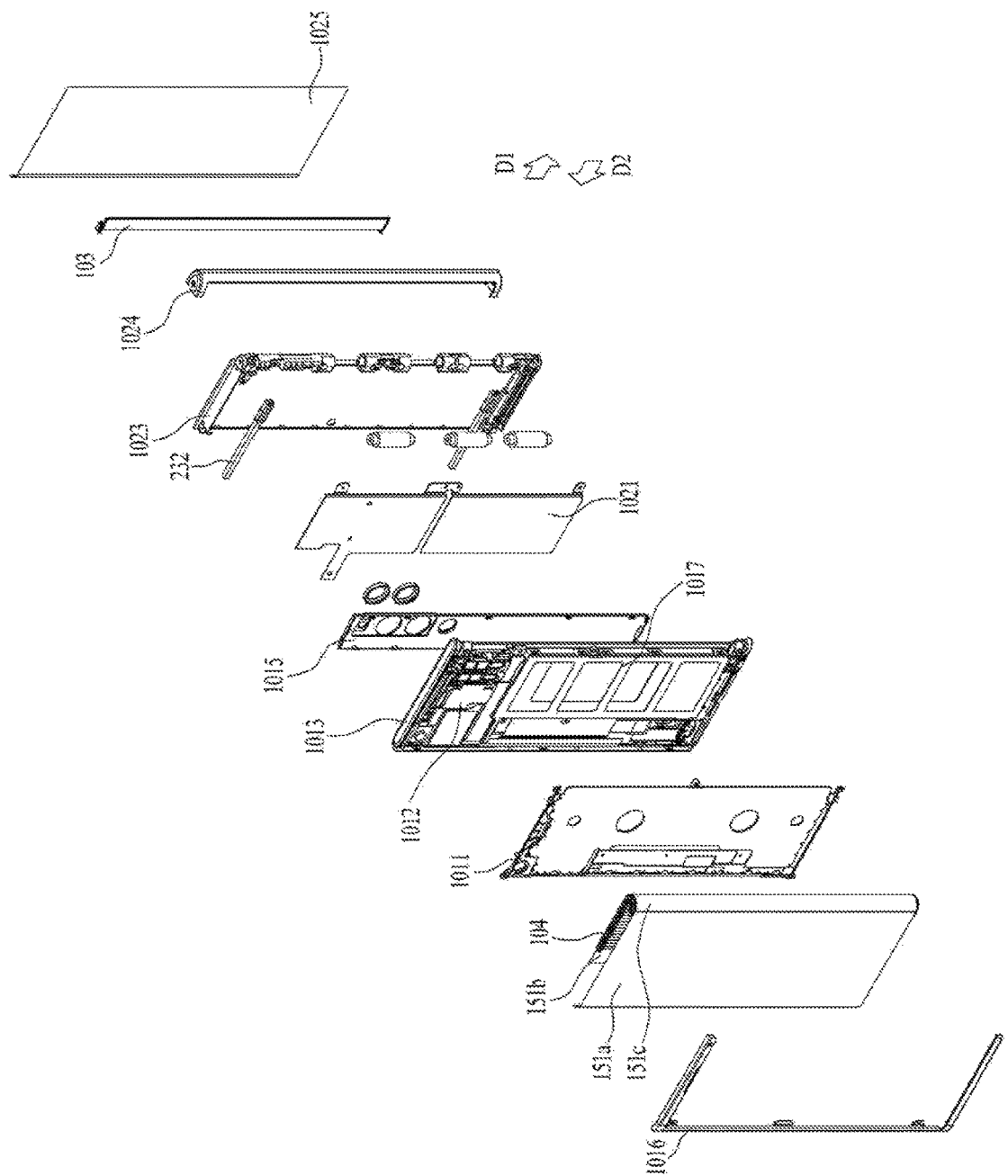
FIGS. 4 and 5 are exploded perspective views of the mobile terminal in accordance with an embodiment.
Figure 5:
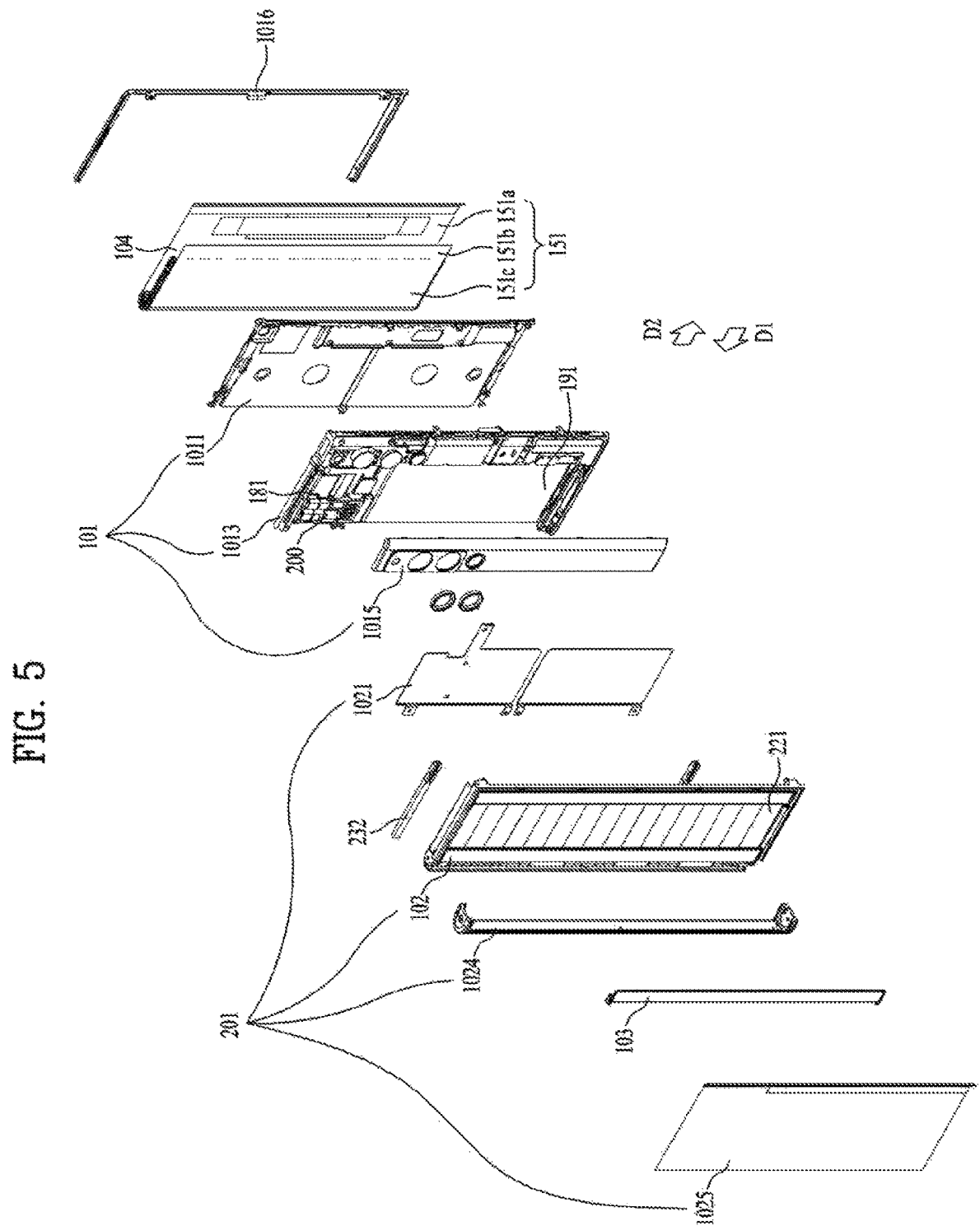

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151a and 151b and a variable portion 151c. The fixed portion 151a and 151b means a portion fixed to the frame. Because of being fixed to the frame, the fixed portion 151a and 151b maintains a constant shape without changing a bending degree. On the other hand, the variable portion 151c means a portion in which a bending angle or a position of the bent portion changes. The variable portion 151c in which the position or bending angle of the bent portion changes requires a structure for supporting a rear face of the variable portion 151c in response to the change.

The fixed portion 151a, 151b is coupled to the first frame of the display unit and is always positioned on the front face of the display unit to form a portion of the front face of the display unit. The variable portion 151c includes a side face located at a side portion of the mobile terminal, and a position of the side face varies depending on the position of the second frame. Based on a side face, an area of a portion disposed on the front face of the display unit and an area of a portion disposed on the rear face of the display unit vary. That is, a portion of the variable portion 151c may be the front face and another portion of the variable portion 151c may be the rear face based on the first and second states. The variable portion 151c is positioned in the first direction with respect to the fixed portion 151a, 151b relative to the mobile terminal, and an end of the variable portion 151c is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(*a*), and may be exposed rearward in the second state as shown in FIG. 3(*b*).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna 116 may be installed on the rear portion 1015. An exposed decor 1015 may be used to protect the camera, the sensor, or the like on the exposed rear portion 1015 and not to deteriorate the exterior design. A portion of the exposed decor 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

Figure 6:
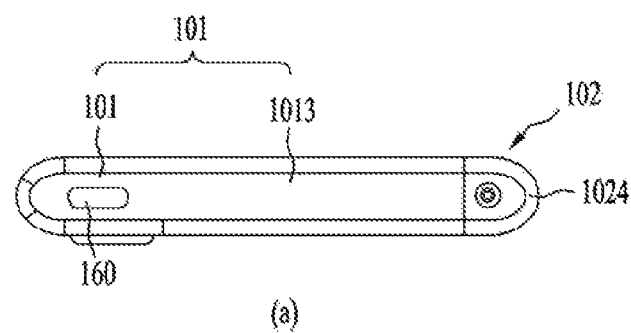
FIG. 6 is a side view of the mobile terminal as viewed from a third direction.
Figure 6:
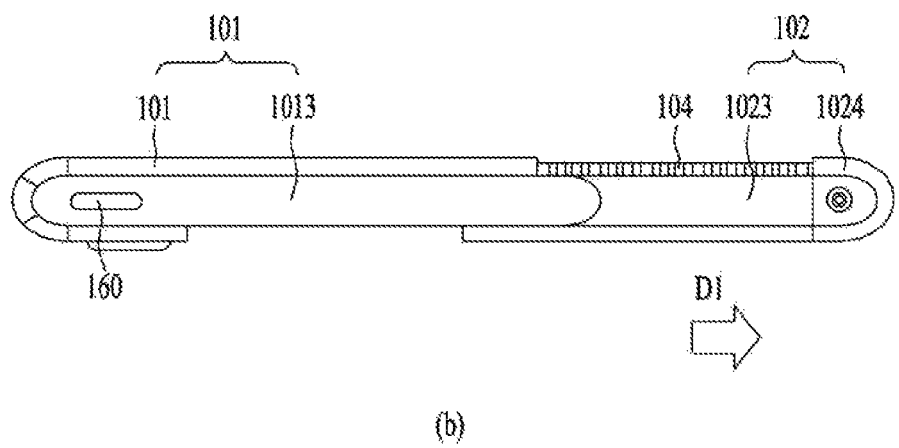

FIG. 6 is a side view of the mobile terminal as viewed from a third direction. FIG. 6 shows the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

Location may be varied according to the state of the mobile terminal. Since a side face is rolled around the roller, the side face is bend with a predetermined curvature and the inner face of a side frame may include a curved face corresponding to the curvature of the side face.

The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151*a* disposed on the front of the mobile terminal 100, a second region 151*b* coupled to a slide frame 103 positioned on the rear of the mobile terminal 100, and a third region 151*c* located between the first region 151*a* and the second region 151*b* and bent around the roller 210. The third region 151*c* may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151*a*, 151*b*, and 151*c* may be connected to each other, and may form a continuous body of the display unit 151. In addition, as described above, for the movement of the third region 151*c* toward the front face or the rear face of the mobile terminal 100 depending on the moving direction of the second frame 102, the first region 151*a* may be fixed so as not to move to the front face of the mobile terminal 100, and the second region 151*b* may be provided to be movable on the rear face of the mobile terminal. Such configuration of the display unit 151 will be described in more detail below.

The first region 151*a* may be disposed on the front face of the mobile terminal 100, more specifically, the first frame 101, that is, on the front face of the first front portion 1011. The first region 151*a* is fixed to the first frame 101, that is, the front face of the first front portion 1011 so as not to be moved during the movement of the second frame 102, and thus, the first region 1511 may always be exposed to the front face of the mobile terminal 100.

The third region 151*c* may be adjacent to the first region 151*a* in a direction of the second side edge 151*e*, and may extend into the second frame 102 and rolled on the roller 210. The third region 151*c* may consecutively extend out of the second frame 102 again and partially cover the second frame 102, that is, the rear face of the second rear portion 1022. Further, the second frame 102, that is, the second rear portion 1022, is adjacent to the first frame 101, that is, the first rear portion 1012 and together forms the rear case of the mobile terminal 100, so that it may be described that the third region 151*c* is also disposed on the rear face of the first frame 101.

The second region 151*b* may be adjacent to the third region 151*c* and may be disposed on the rear face of the mobile terminal 100, more specifically, on the second frame 102, that is, the rear face of the second rear portion 1022 thereof. The second region 151*b* may be coupled to the slide frame 103 without being directly coupled to the second frame 102.

As a result, the first region 151*a* may be disposed on the front face of the mobile terminal 100 and may be always exposed to the front face regardless of the movement of the second frame 102, and the second region 151*b* may be disposed on the rear face of the mobile terminal 100 and may be always exposed to the rear face regardless of the movement of the second frame 102. In addition, the third region 151*c* may be disposed between the first and second regions 151*a* and 151*b*, and may be selectively placed on the front face or the rear face of the mobile terminal 100 depending on the moving directions D1 and D2 of the second frame 102.

Because of such selective placement of the third region 151*c*, as shown in FIG. 4B, the first rear portion 1012 of the first frame 101 may be exposed to the outside of the mobile terminal 100 because the first rear portion 1012 is covered by the second and third regions 151*b* and 151*c* and the second rear portion 1022 of the display unit 151 in the first state, but, in the second state, the third region 151*c* moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151*c* of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151*c* may be rolled on the roller 210 and bent in the second frame 102. When converting from the first state to the second state, the third region 151*c* may extend from the second frame 102 to the front face of the mobile terminal 100 while being rolled on the roller 210 in one direction. On the other hand, when converting from the second state to the first state, the third region 151*c* may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

Figure 7:
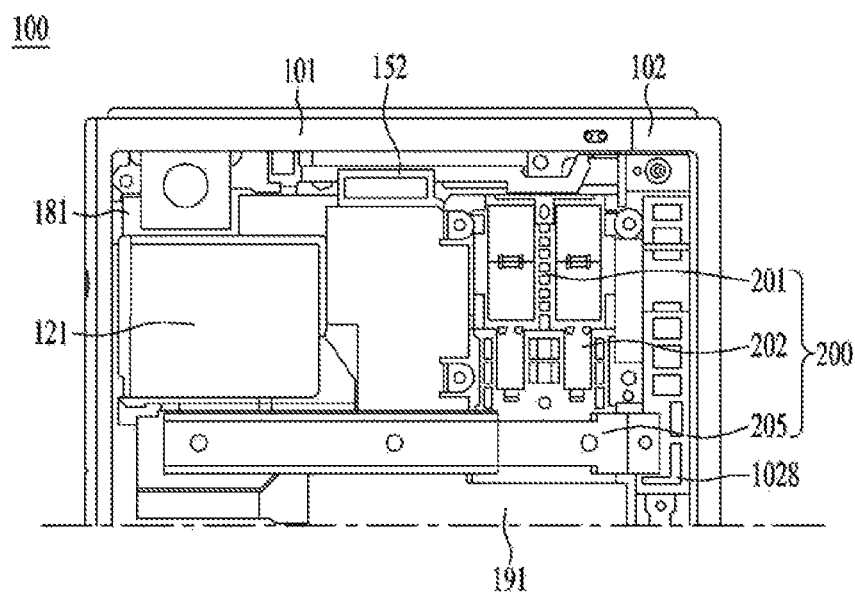
FIG. 7 is a view showing a driving unit of the mobile terminal in accordance with an embodiment.
Figure 7:
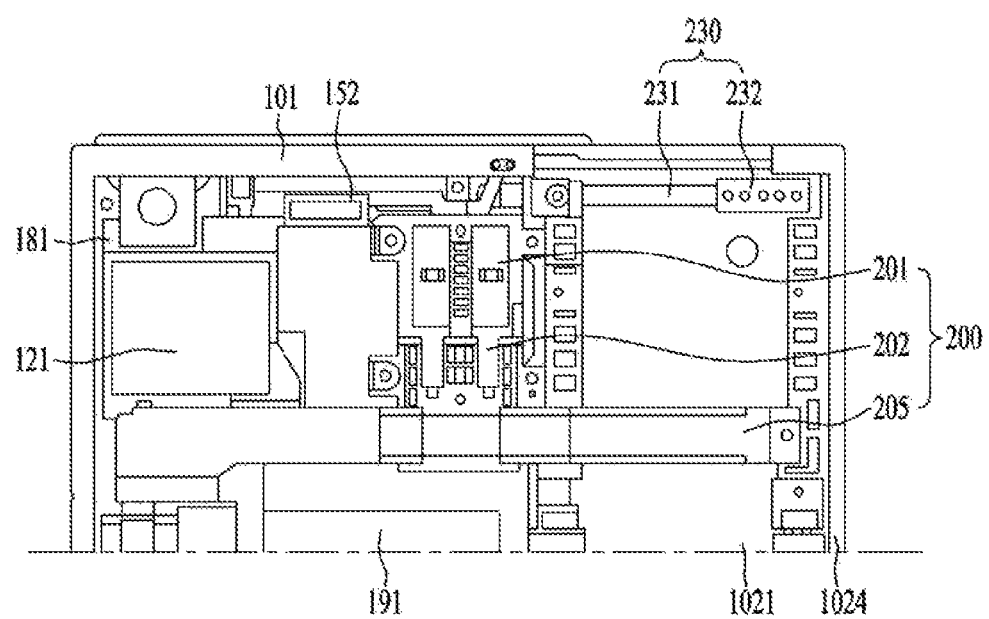

FIG. 7 is a view showing a driving unit 200 of the mobile terminal 100 in accordance with an embodiment. FIG. 7(*a*) shows the first state and FIG. 7(*b*) shows the second state. The mobile terminal 100 of the present disclosure may be switched between the states in a manner in which a user manually pulls the second frame 102 in the first direction D1 or pushes the same in the second direction D2 with respect to the first frame 101. However, in the manual method, applying excessive force to the body of the mobile terminal 100 may damage the mobile terminal 100. Accordingly, a driving unit 200 employing a motor 201 may be further provided to cause the second frame 102 to stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness.

If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state. However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

Figure 8:
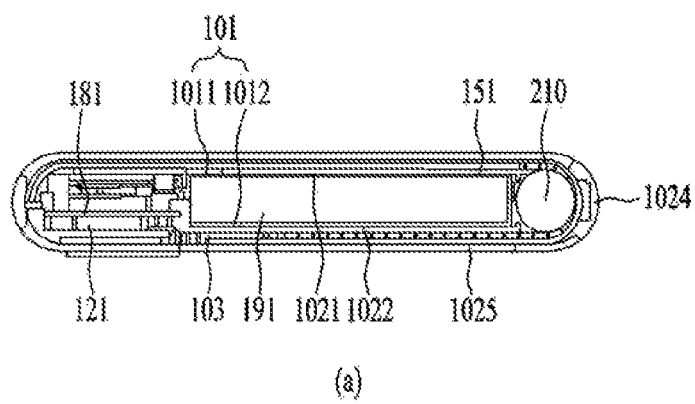
FIG. 8 is a cross-sectional view taken along lines A-A and B-B in FIG. 2.
Figure 8:
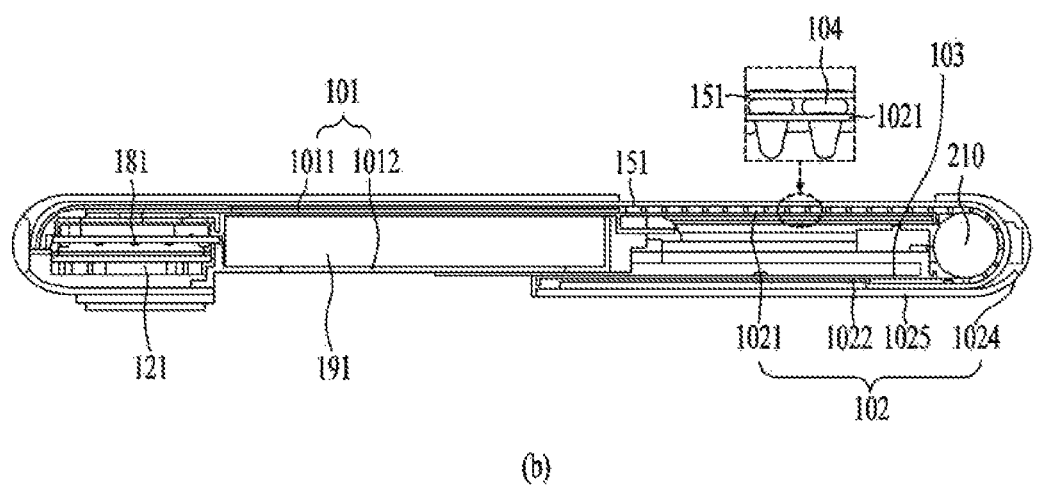

FIG. 8 is a cross-sectional view taken along lines A-A and B-B in FIG. 2.

As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling plate 104 may be used as a support structure to fill the gap between the second front portion 1021 and the third region 151c of the flexible display unit 151.

The rolling plate 104 may be positioned on the rear surface of the flexible display unit 151, and have a thickness corresponding to the gap between the second front portion 1021 and the flexible display unit 151 in the second state. As shown in FIG. 8(a), in the first state, the rolling plate 104 is rolled around the roller 210 and is positioned on the lateral side and rear side of the mobile terminal 100. The flexible display unit 151 and the rolling plate 104 may be positioned between the second rear portion of the second frame 102 and a rear cover 1025 provided to cover the rear face of the display unit 151. As shown in FIG. 8(b), when switch to the second state occurs, the rolling plate 104 may move to the front and the rolling plate 104 may be positioned on the front portion of the second frame 102.

The third region 151c of the display unit 151 in which the rolling plate 104 is positioned is a portion where bending deformation occurs when switch from the first state to the second state occurs. Accordingly, the rolling plate 104 may be deformed according to deformation of the third region 151c. Here, the rolling plate 104 is required to have a predetermined stiffness to maintain the flat state when the flexible display unit 151 is positioned on the front or rear of the mobile terminal. That is, the rolling plate 104 needs a structure capable of maintaining the flat state in the third direction and performing bending deformation in the first direction.

Hereinafter, embodiments related with a control method that may be implemented in the mobile terminal configured as described above will be described with reference to the attached drawings. Those skilled in the art will appreciate that the present disclosure may be carried out in other specific ways than those set forth herein without departing from the spirit and essential characteristics of the present disclosure.

Figure 9:
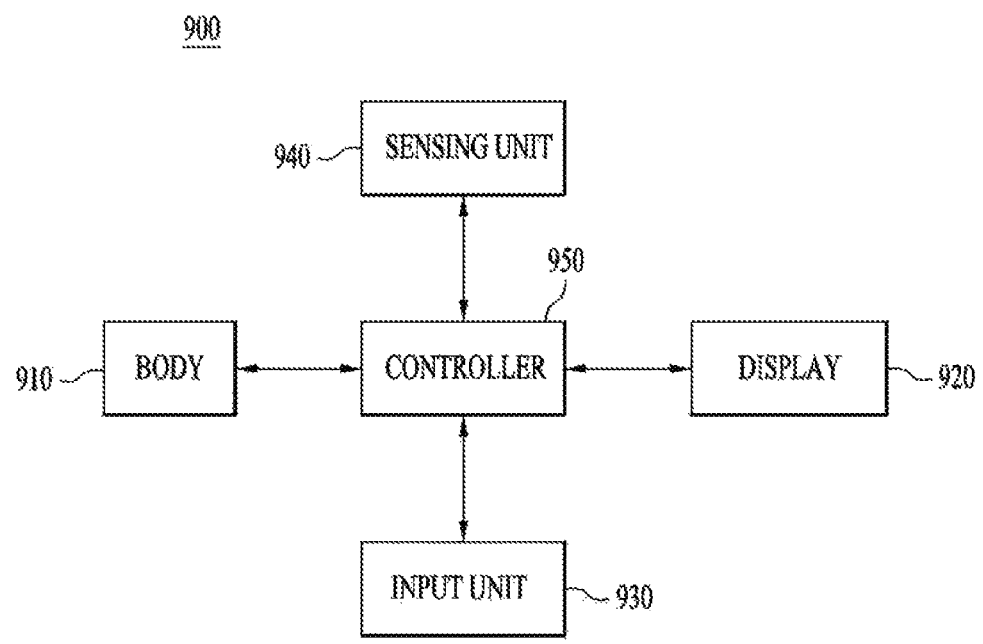
FIG. 9 is a block diagram illustrating constituent modules of a mobile terminal according to an embodiment of the present disclosure.

FIG. 9 is a block diagram illustrating constituent modules of a mobile terminal according to an embodiment of the present disclosure. The block diagram of FIG. 9 is for better explanation of an embodiment of the present disclosure, and the mobile terminal, which will be described below, may be implemented as the mobile terminal illustrated in FIGS. 1 to 8.

Referring to FIG. 9, a mobile terminal 900 according to an embodiment of the present disclosure may include a body 910, a display 920, an input unit 930, a sensing unit 940, and a controller 950.

The body 910 is hardware constituting the mobile terminal 900 and may include a first frame and a second frame.

In an embodiment of the present disclosure, the second frame may be extendable or contractible from the first frame. Here, the first frame and the second frame may be implemented as the first frame and the second frame described with reference to FIGS. 1 to 8. That is, the second frame may be extended or contracted from the first frame manually or automatically by the above-described structure.

In an embodiment of the present disclosure, the mobile terminal 900 may further include a driving unit (not illustrated) for causing the second frame to be extended or contracted. Here, the driving unit may be implemented as the driving unit 200 of FIG. 7.

In an embodiment of the present disclosure, the mobile terminal 900 may operate in an enlarged display mode as the second frame is extended, and may operate in a reduced display mode as the second frame is contracted. The enlarged display mode and the reduced display mode may correspond to the first state and the second state, respectively, described in FIGS. 2 and 3.

The display 920 may be coupled to the body 910 so that a display region viewed from the front of the body 910 may vary as the display 920 switches between the enlarged display mode and the reduced display mode. That is, in an embodiment of the present disclosure, the display 920 may surround the front, side, and rear faces of the body 910. The display 920 may be implemented as the flexible display unit 151 of FIG. 1.

In an embodiment of the present disclosure, as the second frame is extended, a display portion positioned on the side of the body 910 may move to the front of the body 910, and a display portion positioned on the rear of the body 910 may move to the front of the body 910 via the side of the body 910.

In an embodiment of the present disclosure, as the second frame is contracted, the display portion positioned on the front of the body 910 may move to the side of the body 910 or to the rear of the body 910 via the side of the body 910.

In an embodiment of the present disclosure, a state in which the second frame is not extended, i.e., a state in which the mobile terminal 900 is in the reduced display mode, may be defined as a default state.

In an embodiment of the present disclosure, the display 920 may display visual information. The visual information may include text, indicators, icons, content, applications, images, and videos. The display 920 may output visual information on a screen based on a control command of the controller 950.

In an embodiment of the present disclosure, when the display 920 is switched to the enlarged display mode according to an input signal, the display 920 may output visual information on the display 920 which is extended based on a control command of the controller 950.

The input unit 930 may receive various inputs for the mobile terminal 900 from the user and transmit an input result so that the controller 950 may perform operations corresponding to the received inputs. In an embodiment of the present disclosure, the input unit 930 may be provided on the display 920 and may be implemented as a touch screen. The input unit 930 may be implemented as the input unit 120 of FIG. 1.

In an embodiment of the present disclosure, the input unit 930 may detect touch input from the user. In this case, the input unit 930 may detect a point at which the touch input is detected, a touched region, touched pressure, etc.

The sensing unit 940 may include a grip sensor. The sensing unit 940 may be implemented as the sensing unit 140 of FIG. 1.

The grip sensor may sense with which hand a user grips the mobile terminal 900.

More specifically, the mobile terminal 900 may sense with which hand the user grips the mobile terminal 900 using various sensors (e.g., at least one of a proximity sensor, an illumination sensor, a touch sensor, an acceleration sensor, a gravity sensor, a gyroscope sensor, a motion sensor, or a sensor to be developed in the future) included in the mobile terminal 900. The grip sensor may be implemented by being included in a bezel portion which is the side of the body 910.

In an embodiment of the present disclosure, the sensing unit 940 may sense with which hand the user grips the mobile terminal 900 based on touch input sensed by the mobile terminal 900. This will be described in detail with reference to FIGS. 12 and 13.

The controller 950 may process data, control the units of the mobile terminal described above, and control data transmission/reception between the units. In the present disclosure, the controller 950 may be implemented as the controller 180 of FIG. 1.

As an embodiment of the present disclosure, the operations performed by the mobile terminal may be controlled by the controller 950. However, in the drawings and the following description, these operations will be collectively described, for convenience, as being performed/controlled by the mobile terminal.

Hereinafter, embodiments of the present disclosure will be described with reference to FIGS. 10 to 21. In describing and understanding the embodiments of the present disclosure, reference may be made to the above description given with reference to FIGS. 1 to 9.

Figure 10:
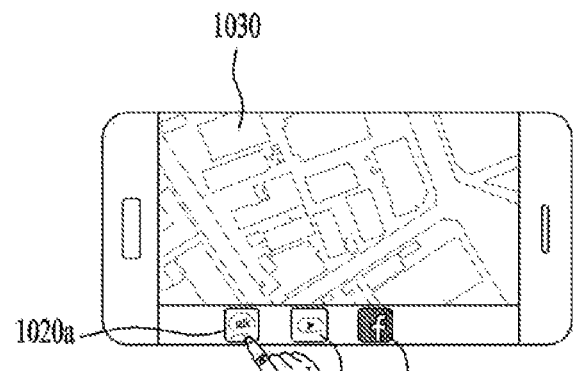
FIG. 10 is a diagram illustrating an embodiment of controlling the location of an application output in a mobile terminal according to an embodiment of the present disclosure.
Figure 10:
Figure 10:
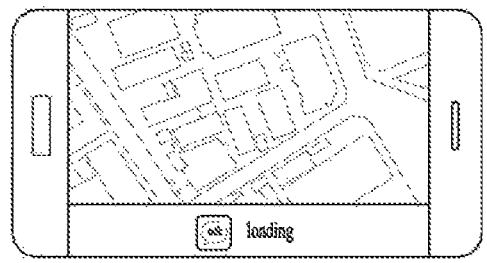
Figure 10:
Figure 10:
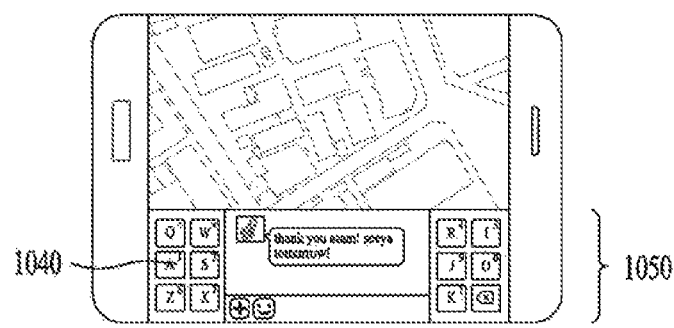
Figure 11:
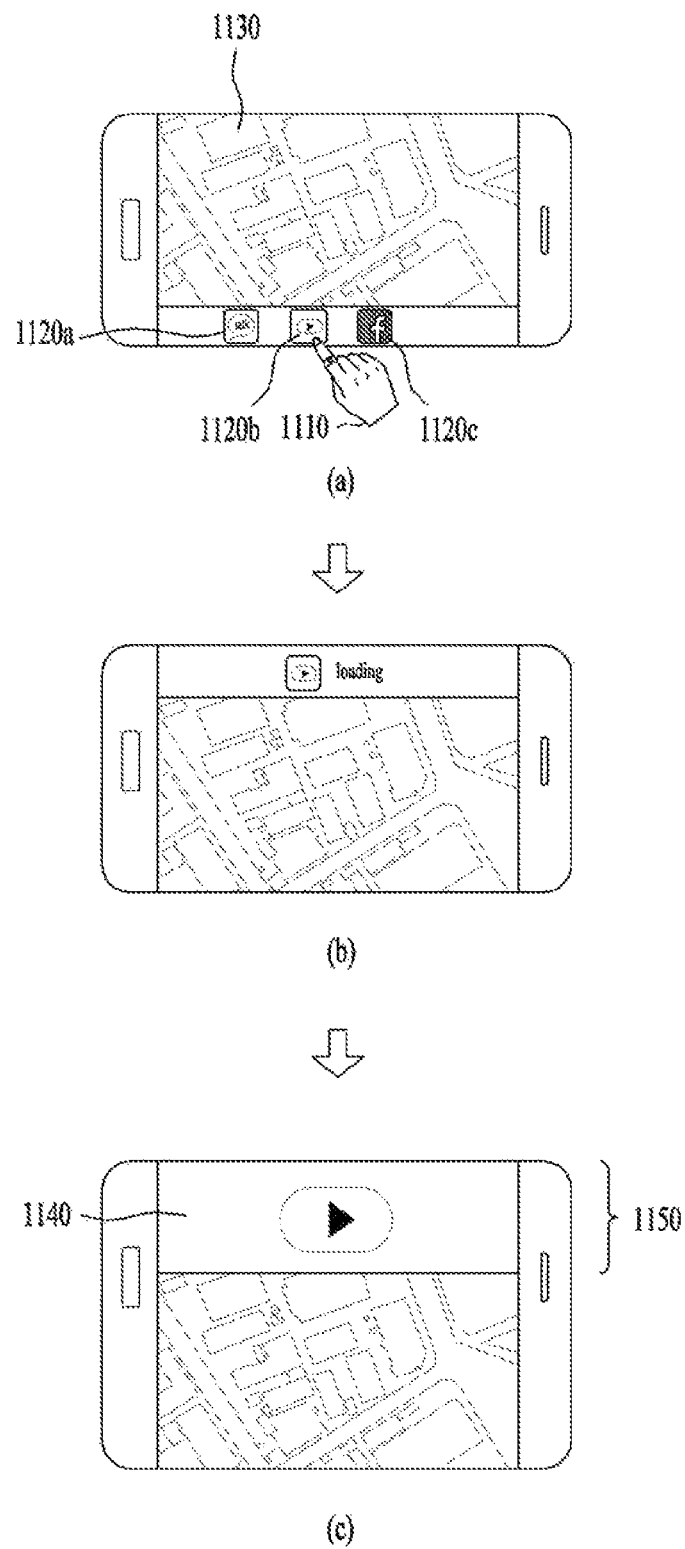
FIG. 11 is a diagram illustrating another embodiment of controlling the location of an application output in a mobile terminal according to an embodiment of the present disclosure.

FIGS. 10 and 11 illustrate an embodiment of controlling the location of an application executed in an enlarged display mode in a mobile terminal according to an embodiment of the present disclosure.

FIG. 10 is a diagram illustrating an embodiment of controlling the location of an application output in a mobile terminal according to an embodiment of the present disclosure.

Referring to (a) of FIG. 10, the mobile terminal may control switching of the display to the enlarged display mode upon sensing an input signal 1010. The input signal 1010 may correspond to a touch input signal for selecting one of icons 1020a, 1020b, and 1020c corresponding to applications that the user may output in the enlarged display mode. In this case, the mobile terminal may output an application 1030 different from the applications corresponding to the icons 1020a, 1020b, and 1020c in a reduced display mode.

In an embodiment of the present disclosure, the mobile terminal may sense the input signal 1010 for selecting the first icon 1020*a*. The first icon 1020*a* may correspond to an indicator for executing a first application 1040.

Accordingly, upon sensing the input signal 1010 while the application 1030 is being executed, the mobile terminal may control switching of the display to the enlarged display mode. In this case, the mobile terminal needs to determine the location of the first application executed on the extended display.

Referring to (b) of FIG. 10, the mobile terminal may determine the characteristics of the first application 1040 upon sensing the input signal 1010. The characteristics of the first application 1040 may be determined by checking whether the first application 1040 requires an input method editor (IME). For example, the first application 1040 may include a social networking service (SNS) application. Generally, since the SNS application necessarily requires the IME, the mobile terminal may determine that the first application requires the IME when the first application is the SNS application.

In an embodiment of the present disclosure, the mobile terminal may execute the first application 1040 in the enlarged display mode based on the characteristics of the first application 1040 upon sensing the input signal 1010.

Referring to (c) of FIG. 10, the mobile terminal may set a location at which the first application 1040 is output when the first application 1040 is executed in the enlarged display mode based on the characteristics of the first application 1040.

More specifically, if the characteristics of the first application 1040 require the IME, the mobile terminal may control output of the first application in a preset region 1050 of the display when the first application 1040 is executed in the enlarged display mode.

In an embodiment of the present disclosure, the preset region 1050 may correspond to a lower region of the extended display after the display is extended in the enlarged display mode.

More specifically, the user of the mobile terminal may execute the first application 1040 requiring the IME in the enlarged display mode in a state in which the user grips the mobile terminal with the hand. In this case, since it is generally assumed that the user uses the first application 1040 in a state in which the user grips the lower region of the mobile terminal with the hand, the mobile terminal may output the first application 1040 in the lower region.

That is, although the preset region 1050 is the lower region of the extended display in (c) of FIG. 10, it is apparent that the preset region 1050 may be another region according to use pattern or necessity of the user. This will be described in detail with reference to FIG. 11.

FIG. 11 is a diagram illustrating another embodiment of controlling the location of an application output in a mobile terminal according to an embodiment of the present disclosure. Hereinbelow, a description overlapping with that given with reference to FIG. 10 will be omitted.

Referring to (a) of FIG. 11, the mobile terminal may control switching of the display to the enlarged display mode upon sensing an input signal 1110. The input signal 1110 may correspond to a touch input signal for selecting one of icons 1120*a*, 1120*b*, and 1120*c* corresponding to applications that the user may output in the enlarged display mode. In this case, the mobile terminal may output an application 1130 different from the applications corresponding to the icons 1120*a*, 1120*b*, and 1120*c* in the reduced display mode.

In an embodiment of the present disclosure, mobile terminal may sense the input signal 1110 for selecting the second icon 1120*b*. The first icon 1120*b* may correspond to an indicator for executing a second application 1140.

Referring to (b) of FIG. 11, the mobile terminal may determine the characteristics of the second application 140 upon sensing the input signal 1110.

In an embodiment of the present disclosure, the characteristics of the application may include user input frequency. The user input frequency may be determined based on the number of times by which user input is sensed for the time while the application is activated. For example, if user touch input for the application is sensed 30 times while the application is executed for one hour, the user input frequency may be determined as 30 times/hour.

In an embodiment of the present disclosure, when the user input frequency of the second application 1140 exceeds a preset value, the mobile terminal may control output of the second application 1140 in the first region (1050 of FIG. 10) of the extended display.

That is, when the user input frequency of the second application 1140 exceeds the preset value, the mobile terminal may determine that the second application 1140 is an application requiring user input of many times based on the characteristics of the application. Then, the mobile terminal may control output of the second application 1140 in the first region which is close to the user hand among regions of the extended display as in the case of FIG. 10.

Referring to (c) of FIG. 11, in an embodiment of the present disclosure, when the user input frequency of the second application 1140 does not exceed the preset value, the mobile terminal may control output of the second application 1140 in a second region 1150 of the extended display. For example, the second application 1140 may include a music/video play application.

More specifically, when the user input frequency of the second application 1140 does not exceed the preset value, the mobile terminal may determine that the characteristics of the second application 1140 is an application that does not require user input of many times.

In an embodiment of the present disclosure, the mobile terminal may control output of the second application 1140 in the second region that is far separated from the user hand so as not to disturb an application 1130 which has been output in the reduced display mode.

Thus, the user may enjoy the newly executed second application 1140 in the extended display while being not disturbed by the existing application 1130.

Figure 12:
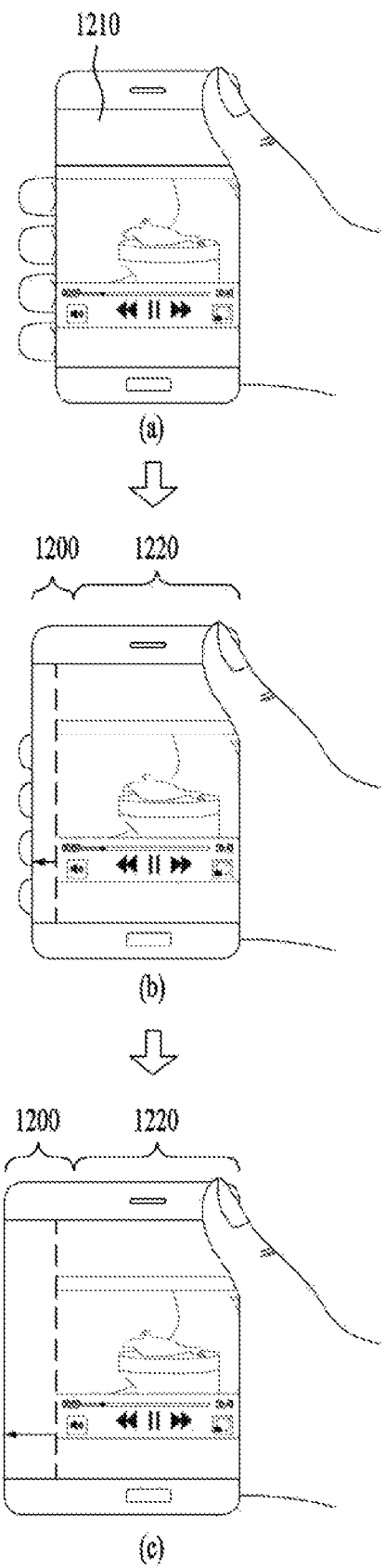
FIG. 12 is a diagram illustrating an embodiment of being switched to an enlarged display mode in a mobile terminal according to an embodiment of the present disclosure.
Figure 13:
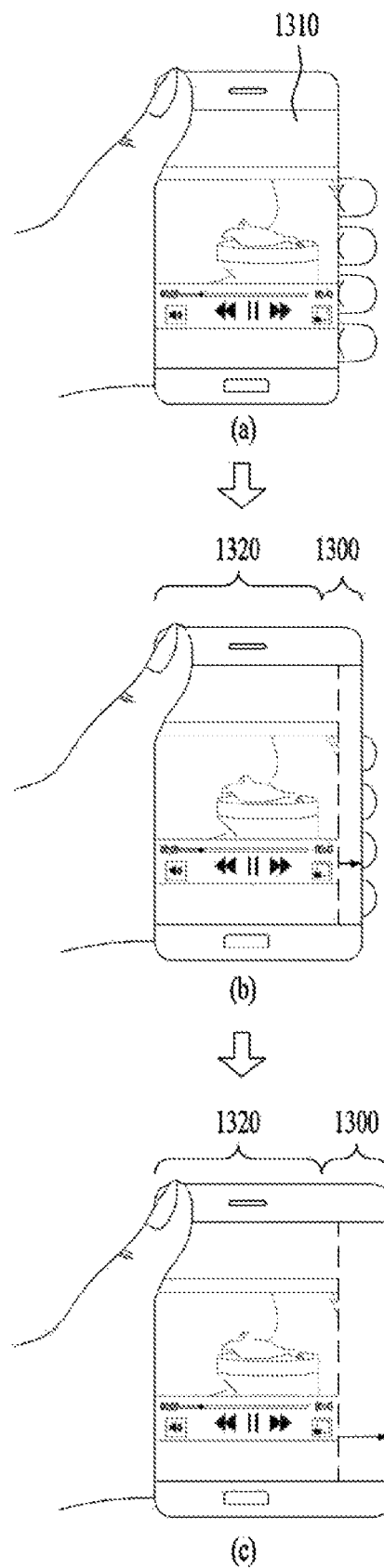
FIG. 13 is a diagram illustrating another embodiment of being switched to an enlarged display mode in a mobile terminal according to an embodiment of the present disclosure.

FIGS. 12 and 13 are diagrams illustrating embodiments of an enlarged display mode according to a mobile terminal grip method of a user. FIG. 12 illustrates an embodiment when a user grips a mobile terminal with the right hand and FIG. 13 illustrates an embodiment when a user grips a mobile terminal with the left hand.

FIG. 12 is a diagram illustrating an embodiment of being switched to an enlarged display mode in a mobile terminal according to an embodiment of the present disclosure.

Referring to (a) of FIG. 12, in an embodiment of the present disclosure, the mobile terminal may determine a grip method of the user based on a sensed input location of the user.

More specifically, the mobile terminal may determine the grip method of the user based on a touch input location of the user.

In an embodiment of the present disclosure, if touch input of one finger is sensed in a right region of the display and touch input of four fingers is sensed in a left region of the display, the mobile terminal may determine that the user is gripping the mobile terminal with the right hand.

In an embodiment of the present disclosure, the mobile terminal may register fingerprints of the left hand and the right hand. In this case, the mobile terminal may determine with which hand the user grips the mobile terminal based on a fingerprint of a touched finger.

Referring to (b) and (c) of FIG. 12, in an embodiment of the present disclosure, the mobile terminal may control switching of the display to the enlarged display mode based on the determined grip method of the user.

More specifically, upon determining that the user grips the mobile terminal with the right hand, the mobile terminal may control output of content in a left region 1200 of the extended display.

In an embodiment of the present disclosure, the mobile terminal may correspond to a state in which first content 1210 is being output in the reduced display mode. In this case, if it is determined that the user grips the mobile terminal with the right hand, when the display is switched to the enlarged display mode, the mobile terminal may control output of second content in a left region 1200, which is an extended second region, in a state in which the output of the first content 1210 is maintained in a first region, i.e., a right region 1220.

In an embodiment of the present disclosure, the mobile terminal may determine the first region and the second region according to a grip direction of the mobile terminal. That is, in the embodiment of FIG. 12, since the user grips the mobile terminal with the right hand, the first region may become the right region 1220 and the second region may become the left region 1200. Another embodiment will be described in detail with reference to FIG. 13.

As such, the mobile terminal may extensively output content which is newly executed according to the grip method of the user on the display in a direction in which the user does not grip the mobile terminal. Then, the user may use the newly executed content in the extended display while being not disturbed by existing content which has been output.

FIG. 13 is a diagram illustrating another embodiment of being switched to an enlarged display mode according to an embodiment of the present disclosure. Hereinbelow, a description overlapping with that given with reference to FIG. 12 will be omitted.

Referring to (a) of FIG. 13, when touch input of one finger is sensed in a left region of the display and touch input of four fingers is sensed in a right region of the display, the mobile terminal may determine that the user is gripping the mobile terminal with the left hand.

Referring to (b) and (c) of FIG. 13, the mobile terminal may control switching of the display to the enlarged display mode based on the determined grip method.

More specifically, if the mobile terminal determines that the user grips the mobile terminal with the left hand and if the display is switched to the enlarged display mode, the mobile terminal may control output of content in a right region 1300 of the extended display.

That is, as illustrated in (a) of FIG. 13, the mobile terminal may output first content 1310 in the reduced display mode. In this case, if the mobile terminal determines that the user grips the mobile terminal with the left hand and if the display is switched to the enlarged display mode, the mobile terminal may control output of second content in the extended right region 1300 while maintaining output of the first content 1310 in a left region 1320.

As such, when the user grips the mobile terminal with the left hand, the newly output second content may be output in the right region 1300 to use the enlarged display mode without disturbing the first content 1310 which has been output.

That is, referring to FIGS. 12 and 13, the mobile terminal may be substantially extended only in one direction according to the location of a driving unit. However, the mobile terminal may adjust the location of content output in the enlarged display mode, so that an effect of extending the mobile terminal in both directions may be obtained.

Figure 14:
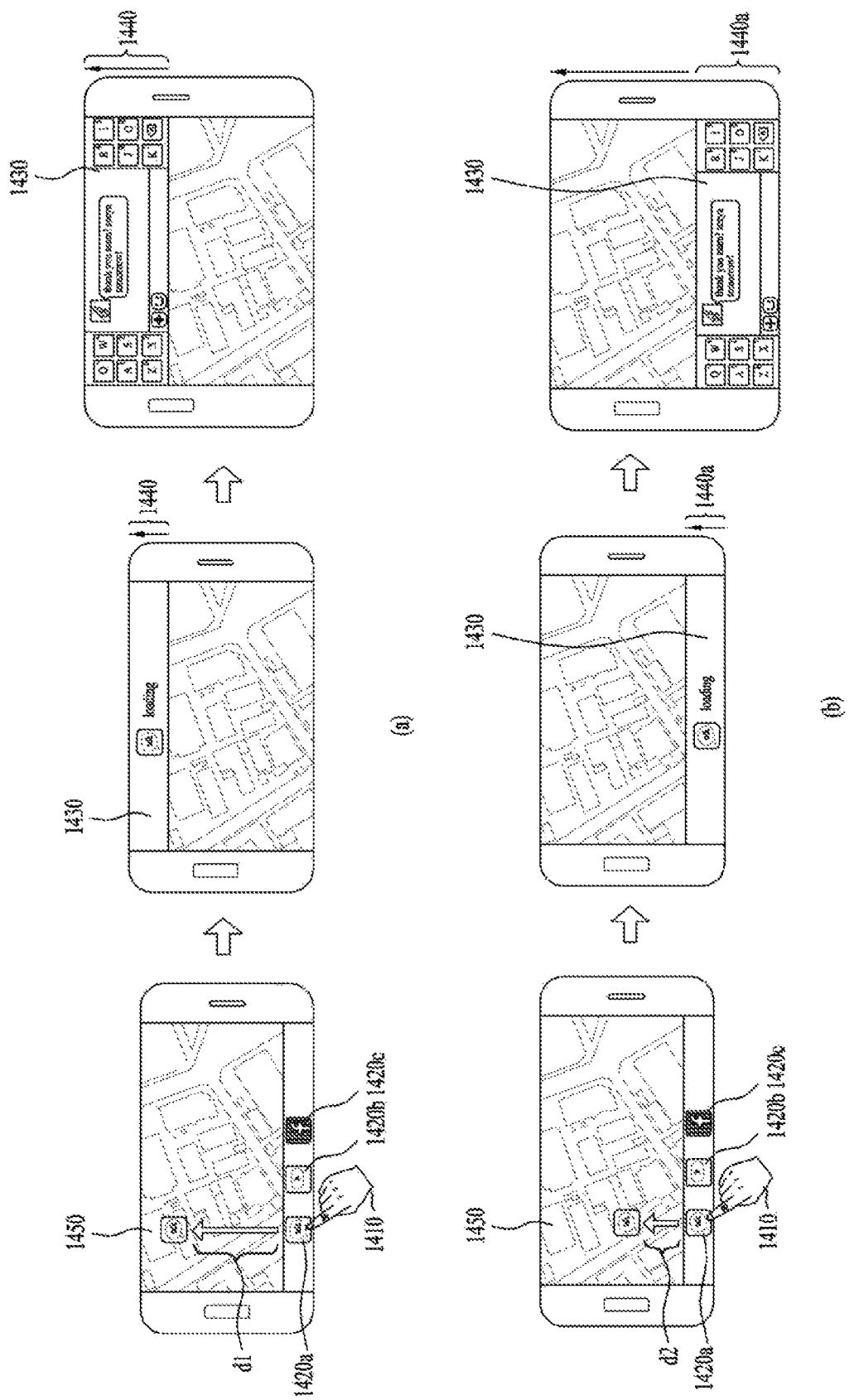
FIG. 14 is a diagram illustrating an embodiment of being switched to an enlarged display mode based on user input in a mobile terminal according to an embodiment of the present disclosure.

FIG. 14 is a diagram illustrating an embodiment of being switched to an enlarged display mode based on user input in a mobile terminal according to an embodiment of the present disclosure.

In an embodiment of the present disclosure, the mobile terminal may execute an application in the enlarged display mode according to an input signal and determine the output location of the executed application based on the input signal.

More specifically, when sensing touch drag, the mobile terminal may determine the output location of the executed application based on touched and dragged length.

An embodiment of outputting an application at a different location according to touched and dragged length will now be described with reference to (a) and (b) of FIG. 14.

Referring to the first drawing of (a) of FIG. 14, the mobile terminal may sense a first input signal 1410. The first input signal 1410 may correspond to an input signal for selecting one of icons 1420a, 1420b, and 1420c corresponding to applications that may be output in the enlarged display mode. Here, the icons 1420a, 1420b, and 1420c may correspond to indicators for executing applications.

In an embodiment of the present disclosure, the first input signal 1410 may correspond to a touch drag input signal of touching and then dragging the first icon 1420a.

Referring to the second and third drawings of (a) of FIG. 14, the mobile terminal may control switching of the display to the enlarged display mode upon sensing the first input signal 1410 and control output of a first application 1430 corresponding to the first icon 1420a on the extended display.

In an embodiment of the present disclosure, the mobile terminal may determine the output location of the executed first application 1430 based on a dragged length d1 of the first input signal 1410.

More specifically, when the dragged length d1 of the first input signal 1410 exceeds a preset length d, the mobile terminal may control output of the first application 1430 in a first region 1440.

In an embodiment of the present disclosure, the first region 1440 may correspond to an upper region when the mobile terminal is switched to the enlarged display mode.

Therefore, upon sensing the first input signal 1410 while maintaining output of an application 1450 which has been output in a lower region, the mobile terminal may be switched to the enlarged display mode and may extensively output the executed first application 1430 in the upper region.

Referring to the first drawing of (b) of FIG. 14, the mobile terminal may sense a second input signal 1410a. The second input signal 1410a may correspond to an input signal for selecting one of the icons 1420a, 1420b, and 1420c corresponding to applications that may be output in the enlarged display mode. The icons 1420a, 1420b, and 1420c may correspond to indicators for executing applications.

In an embodiment of the present disclosure, the second input signal 1410a may correspond to a touch drag input signal of touching and dragging the first icon 1420a.

Unlike (a) of FIG. 14, the second input signal 1410a may correspond to a touch drag input signal of touching the first icon 1420a and dragging the first icon 1420a by d2.

More specifically, referring to the second and third drawings of (b) of FIG. 14, the mobile terminal may control switching of the display to the enlarged display mode upon sensing the second input signal 1410a and control output of the first application 1430 corresponding to the first icon 1420a on the extended display.

In an embodiment of the present disclosure, the mobile terminal may determine the output location of the executed first application 1430 based on a dragged length d2 of the second input signal 1410a.

In an embodiment of the present disclosure, if the dragged length d2 of the second input signal 1410a exceeds the preset value d, the mobile terminal may control output of the first application 1430 in a second region 1440a.

In an embodiment of the present disclosure, the second region 1440a may correspond to a lower region when the mobile terminal is switched to the enlarged display mode.

Thus, upon sensing the second input signal 1410a while moving output of the application 1450 which has been output to an upper region, the mobile terminal may be switched to the enlarged display mode and may extensively output the executed first application 1430 in the lower region.

That is, if the dragged length of the sensed touched drag input signal exceeds the preset value, the mobile terminal may intuitively output an application in an upper region which is far separated from the hand of the user. On the other hand, if the dragged length of the sensed touched drag input signal does not exceed the preset value, it is determined that the mobile terminal intends to output a new application in a region close to the hand of the user so that the application may be output in a lower region which is close to the hand of the user.

Figure 15:
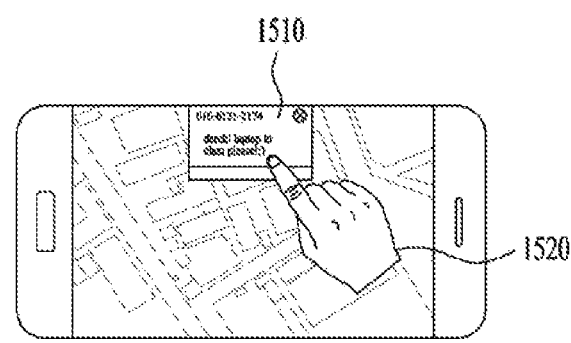
FIG. 15 is a diagram illustrating another embodiment of being switched to an enlarged display mode based on user input in a mobile terminal according to an embodiment of the present disclosure.
Figure 15:
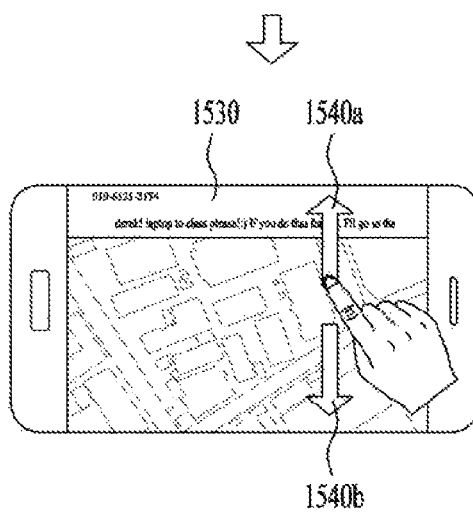
Figure 15:
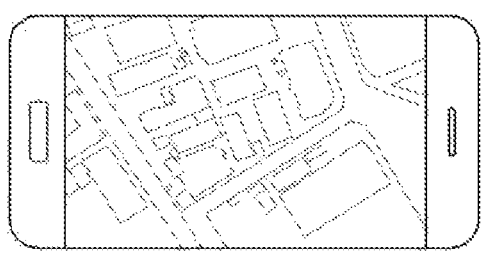
Figure 15:
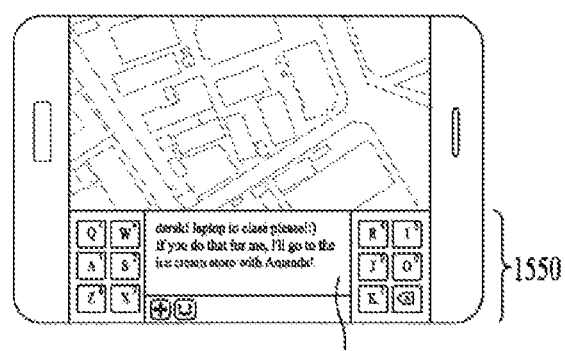

FIG. 15 is a diagram illustrating another embodiment of being switched to an enlarged display mode based on user input in a mobile terminal according to an embodiment of the present disclosure.

Referring to the first drawing of FIG. 15, the mobile terminal may receive an alarm. The mobile terminal may control output of an alarm window 1510 corresponding to the received alarm on the display. For example, when the received alarm is a text message, the alarm window 1510 may correspond to a summary message of an entire text message.

In an embodiment of the present disclosure, the mobile terminal may output the alarm window 1510 corresponding to the received alarm in the reduced display mode.

Referring to the second drawing of FIG. 15, when the mobile terminal senses a first input signal 1520 for the alarm window 1510, the mobile terminal may control output of a first mode of a first application 1530 corresponding to the alarm window 1510 on the extended display. Here, the first mode of the first application 1530 may correspond to a simple mode of the first application 1530.

In an embodiment of the present disclosure, upon sensing a first input signal 1520 for the alarm window 1510, the mobile terminal may control switching of the display to the enlarged display mode.

Referring to the above-described example, the first application 1530 may correspond to a text application and the first mode of the first application 1530 may correspond to a mode for outputting a full text message. Accordingly, the mobile terminal may output the full text message on the extended display.

Unlike the configuration shown in the drawing, upon sensing the first input signal 1520 for the alarm window 1510, it is apparent that the mobile terminal may output the first mode of the first application 1530 in a lower region of the extended display.

In an embodiment of the present disclosure, upon sensing a second input signal 1540a of a first direction for the first mode, the mobile terminal may end output of the first mode as illustrated in (a) of FIG. 15. For example, the first direction may be an upper direction but it is apparent that the first direction may be changed according to setting of the user.

In an embodiment of the present disclosure, upon sensing the second input signal 1540a of the first direction for the first mode, the mobile terminal may end output of the first mode and simultaneously control switching of the display to the reduced display mode from the enlarged display mode.

That is, upon sensing the second input signal 1540a of the first direction for the first mode, the mobile terminal may determine that the user does not intend to confirm the alarm window 1510 for the first application 1530 or the first mode of the first application 1530 and end output of the first mode.

In an embodiment of the present disclosure, upon sensing a second input signal 1540b of a second direction for the first mode, the mobile terminal may control output of the second mode of the first application 1530 on the extended display as illustrated in (b) of FIG. 15. The second mode of the first application 1530 may correspond to a mode for executing the first application 1530. Although the second direction may correspond to a lower direction, it is apparent that the second direction may be changed according to setting of the user.

In an embodiment of the present disclosure, the mobile terminal may output the second mode of the first application 1530 in a lower region 1550 of the enlarged display mode upon sensing the second input signal 1540b of the second direction for the first mode. In the above-described example, the mobile terminal may output the first application 1530 in the lower region 1550 of the extended display including an IME upon sensing the second input signal 1540b.

Although not illustrated in the drawing, in another embodiment of the present disclosure, it is apparent that the mobile terminal may output the second mode of the first application 1530 in the upper region upon sensing the second input signal 1540b of the second direction for the first mode.

Figure 16:
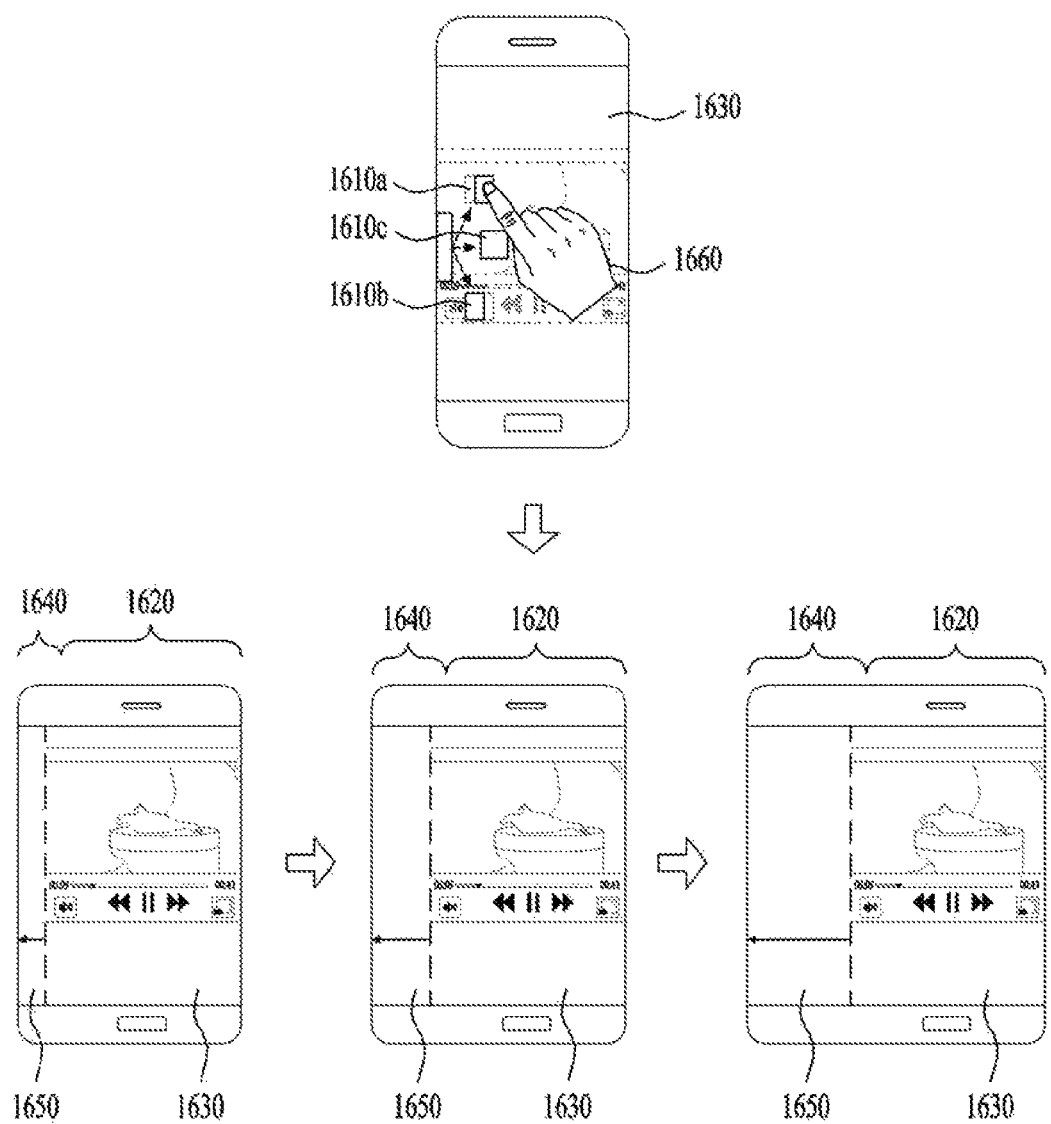
FIG. 16 is a diagram illustrating another embodiment of being switched to an enlarged display mode based on user input in a mobile terminal according to an embodiment of the present disclosure.
Figure 17:
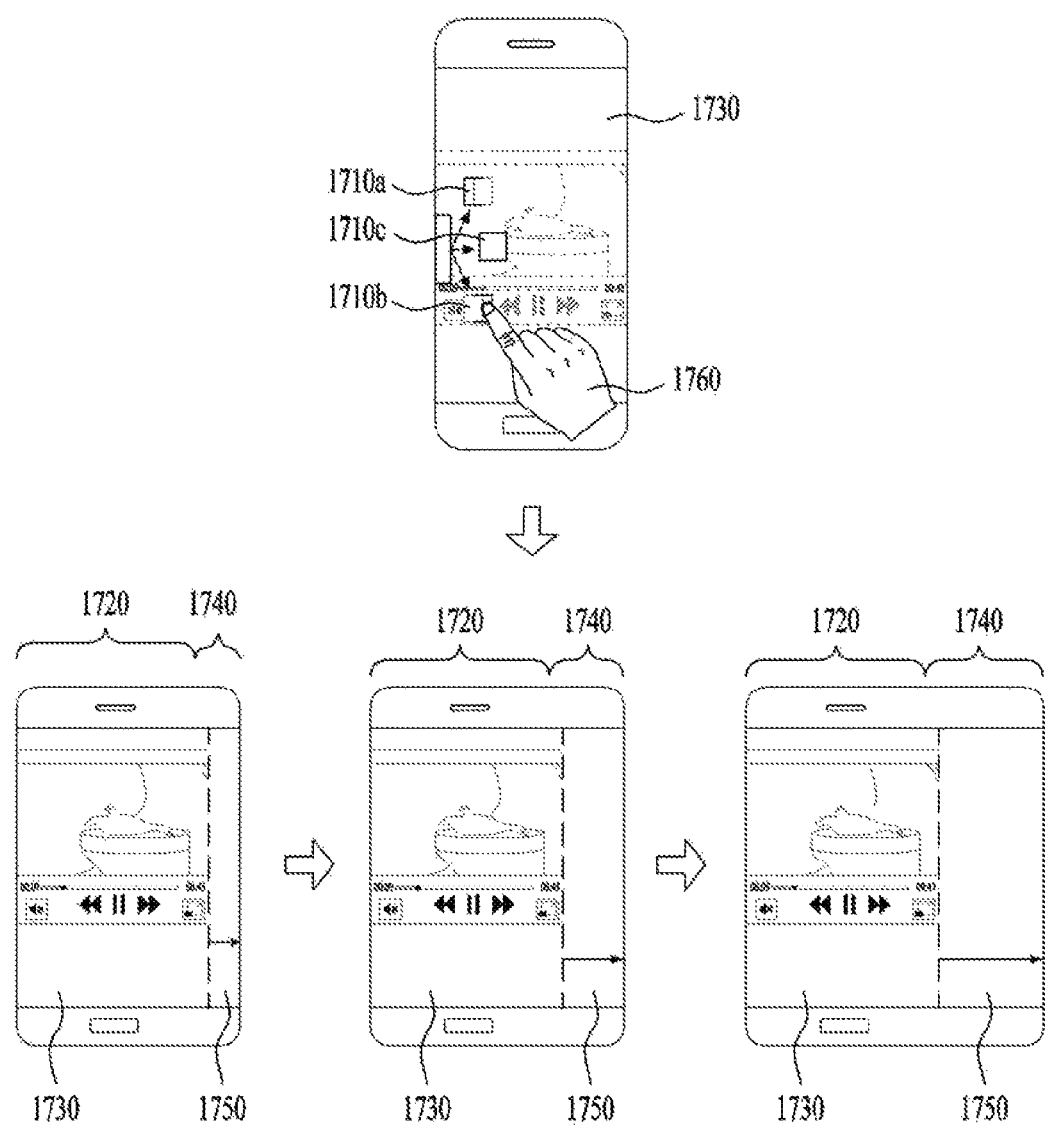
FIG. 17 is a diagram illustrating another embodiment of being switched to an enlarged display mode based on user input in a mobile terminal according to an embodiment of the present disclosure.
Figure 18:
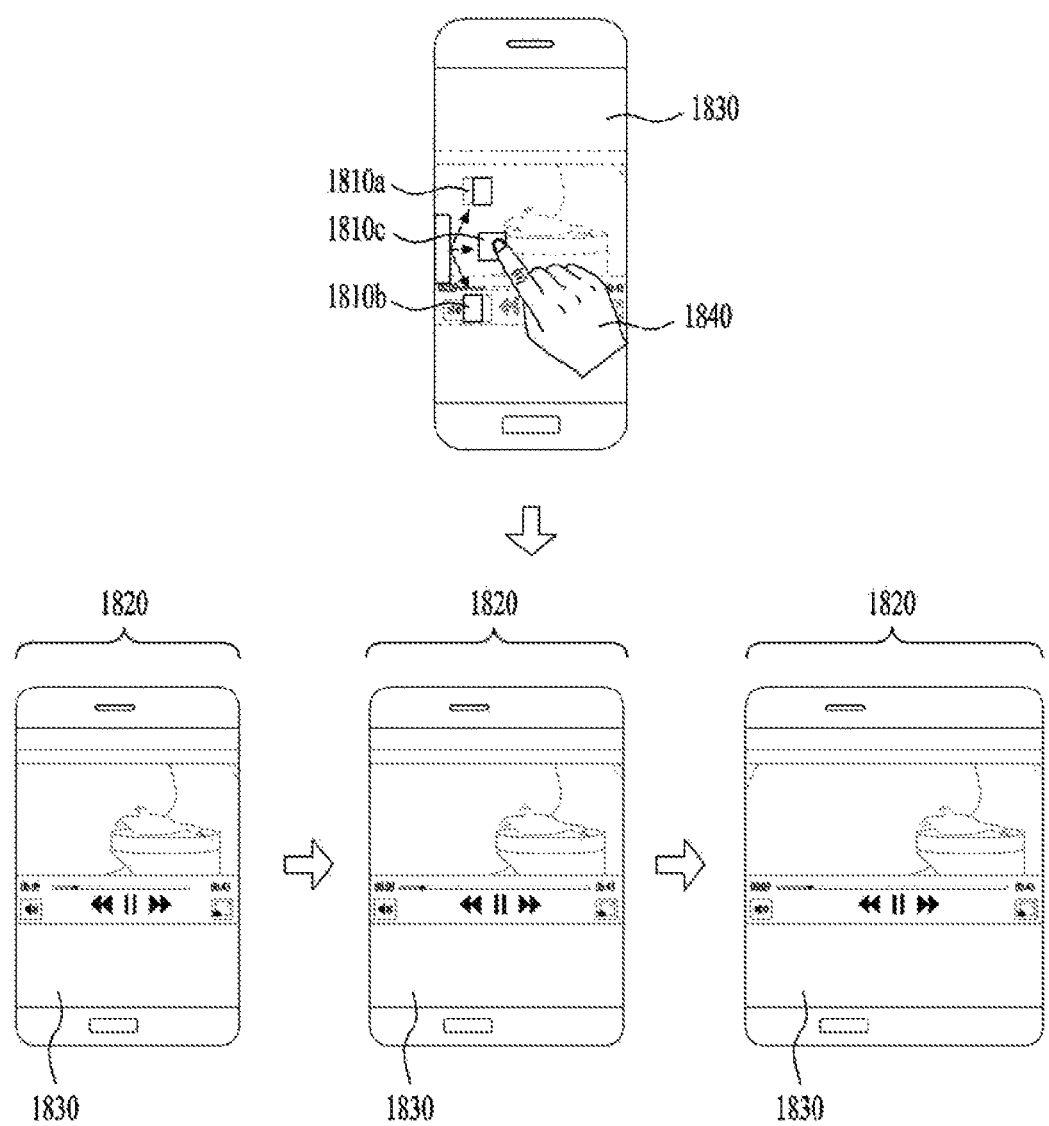
FIG. 18 is a diagram illustrating another embodiment of being switched to an enlarged display mode based on user input in a mobile terminal according to an embodiment of the present disclosure.

FIGS. 16 to 18 are diagrams illustrating an embodiment in which a display is switched to the enlarged display mode based on user input.

In an embodiment of the present disclosure, the mobile terminal may automatically switch the display to the enlarged display mode based on an input signal through which the user desires to execute an application that may be output in the extended display.

Meanwhile, as illustrated in FIGS. 16 to 19, the mobile terminal may switch the display to the enlarged display mode based on an input signal through which the user may directly switch the display to the enlarged display mode. This will now be described.

FIG. 16 is a diagram illustrating another embodiment of being switched to an enlarged display mode based on user input in a mobile terminal according to an embodiment of the present disclosure.

Referring to FIG. 16, the mobile terminal may output one or more indicators 1610a, 1610b, and 1610c on the display according to a first input signal (not illustrated).

In an embodiment of the present disclosure, the first input signal may correspond to a trigger signal for outputting at least one indicator. For example, the user may output at least one indicator by touching and dragging a left side portion of the mobile terminal with the hand.

In an embodiment of the present disclosure, each of the indicators 1610a, 1610b, and 1610c may indicate a layout of content output when the display is switched to the enlarged display mode.

More specifically, the first indicator 1610a may indicate a layout in which output of first content 1630 which has been output is maintained in a right region 1620 of the extended display and second content 1650 is output in a left region 1640 of the display, when the mobile terminal switches the display to the enlarged display mode.

In an embodiment of the present disclosure, the second content 1650 may correspond to a home screen but is not limited to the home screen. That is, the second content 1650 may correspond to various preset applications. This will be described in detail with reference to FIG. 20.

In an embodiment of the present disclosure, the mobile terminal may switch the display to the enlarged display mode upon sensing a second input signal 1660 for selecting the first indicator 1610a.

More specifically, the mobile terminal may switch the display to the enlarged display mode according to the second input signal 1660 and control output of the first content 1630 in the right region 1620 of the display without extension and to extensively output the newly output second content 1650 in the left region 1640 of the display.

Accordingly, the user may determine in which region the user is to directly output the first content 1630 and the second content 1650 by confirming an indicator.

Hereinafter, an embodiment of selecting another indicator will be described with reference to FIGS. 17 and 18.

FIG. 17 is a diagram illustrating another embodiment of being switched to an enlarged display mode based on user input in a mobile terminal according to an embodiment of the present disclosure. Hereinbelow, a description overlapping with that given with reference to FIG. 16 will be omitted.

Referring to FIG. 17, the mobile terminal may output one or more indicators 1710a, 1710b, and 1710c on one side portion of the display.

The second indicator 1710b may indicate a layout in which first content 1730 which has been output is maintained in a left region 1720 of the extended display and second content 1750 is output in a right region 1740 of the display, when the mobile terminal switches the display to the enlarged display mode.

In an embodiment of the present disclosure, the mobile terminal may switch the display to the enlarged display mode upon sensing a second input signal 1760 for selecting the second indicator 1710b.

That is, the mobile terminal may switch the display to the enlarged display mode according to the second input signal 1760 and control output of the first content 1730 in the left region 1720 of the display without extension and to extensively output the newly output second content 1750 on the right region 1740 of the display.

That is, unlike FIG. 16, the first content 1730 may be output in the left region 1720 and the second content 1750 may be extensively output in the right region 1740.

FIG. 18 is a diagram illustrating another embodiment of switching a mobile terminal according to an embodiment of the present disclosure to an enlarged display mode based on user input. Hereinbelow, a description overlapping with that given with reference to FIG. 16 will be omitted.

Referring to FIG. 18, the mobile terminal may output one or more indicators 1810a, 1810b, and 1810c.

In an embodiment of the present disclosure, the indicators 1810a, 1810b, and 1810c may indicate a layout of content output when the display is switched to the enlarged display mode.

More specifically, the third indicator 1810c may indicate a layout in which first content 1830 which has been output is extensively output in a full region 1820 of the extended display when the mobile terminal switches the display to the enlarged display mode.

That is, the mobile terminal may switch the display to the enlarged display mode according to an input signal 1840 for selecting the third indicator 1810c and control extensive output of the first content 1830 which has been output in the full region 1820 of the extended display.

Thus, the first content 1830 may be output while being gradually extended based on extension of the display and finally output on a full screen.

Figure 19:
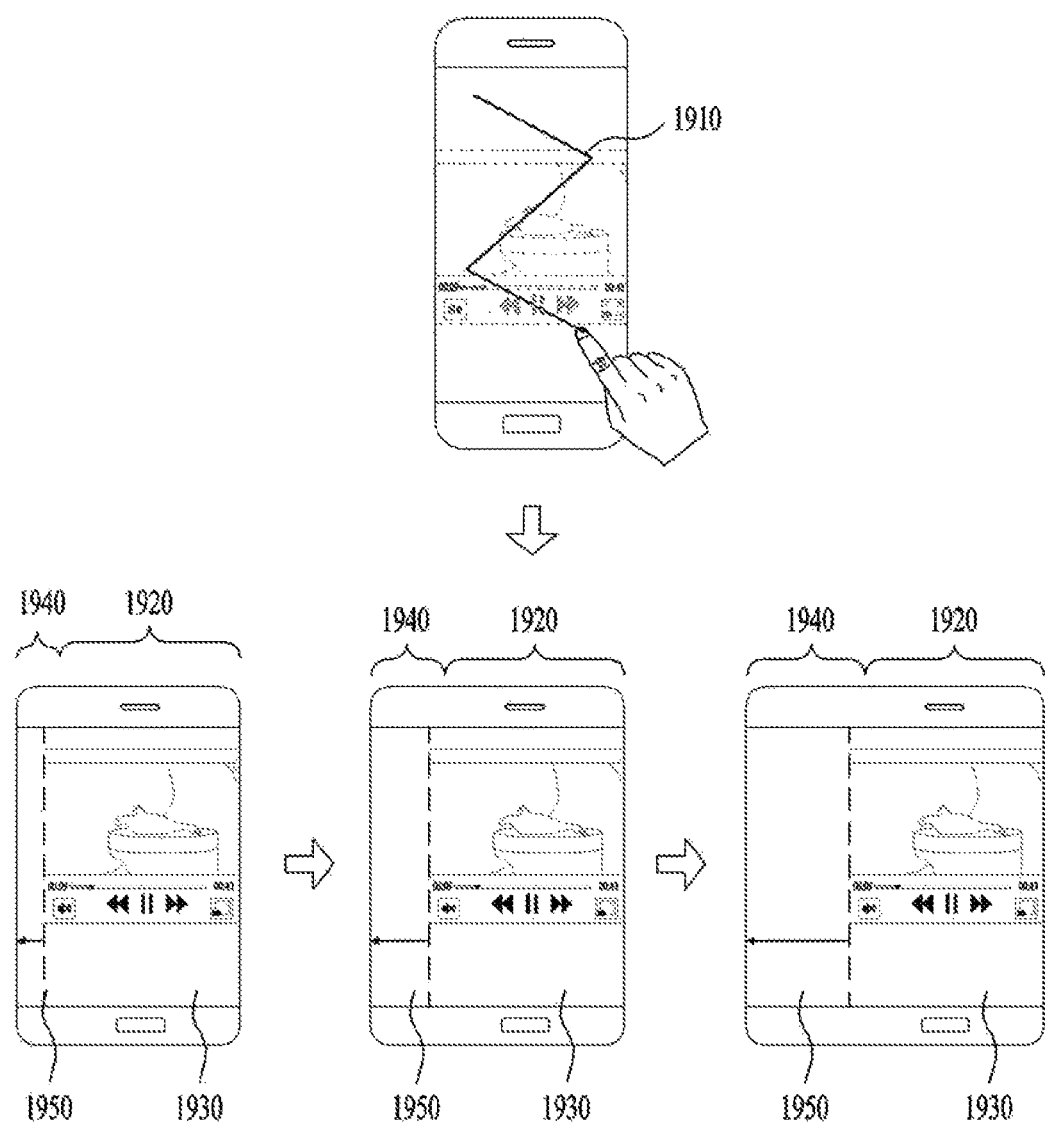
FIG. 19 is a diagram illustrating another embodiment of being switched to an enlarged display mode based on user input in a mobile terminal according to an embodiment of the present disclosure.

FIG. 19 is a diagram illustrating another embodiment of being switched to an enlarged display mode based on user input in a mobile terminal according to an embodiment of the present disclosure.

Referring to FIG. 19, the mobile terminal may switch the display to the enlarged display mode based on a preset gesture.

In an embodiment of the present disclosure, the mobile terminal may switch the display to the enlarged display mode upon sensing a preset gesture 1910.

More specifically, the preset gesture 1910 corresponding to the indicators illustrated in FIGS. 16 to 18 may configured for the mobile terminal. That is, the user may map the preset gesture 1910 to the first indicator 1610a of FIG. 16. Then, upon sensing the preset gesture 1910, the mobile terminal may perform the same operation as in the case in which the mobile terminal senses the input signal for selecting the first indicator 1610a.

That is, upon sensing the preset gesture 1910, the mobile terminal may switch the display to the enlarged display mode and output first content 1930 which has been output in a right region 1920 of the extended display and second content 1950 which is newly output in a left region 1940 of the extended display.

Accordingly, the user may set a layout which is frequently used in the extended display as the preset gesture 1910, so that the display may be extended only by a simple gesture and content may be output.

Figure 20:
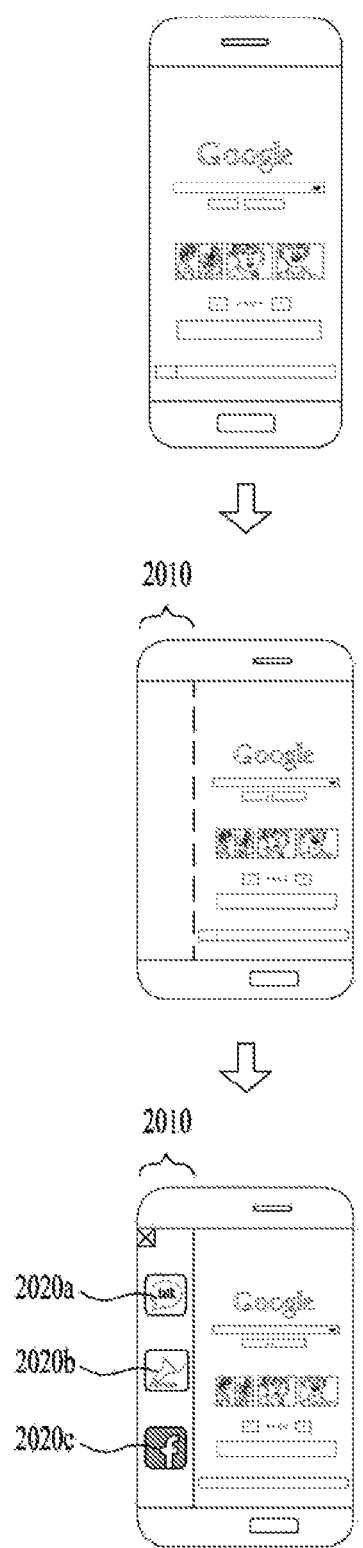
FIG. 20 is a diagram illustrating content output when a display is switched to an enlarged display mode in a mobile terminal according to an embodiment of the present disclosure.

FIG. 20 is a diagram illustrating content output when a display is switched to an enlarged display mode in a mobile terminal according to an embodiment of the present disclosure.

Referring to FIG. 20, upon switching the display to the enlarged display mode, the mobile terminal may control output of one or more icons 2020a, 2020b, and 2020c in an extended display region 2010. In this case, the one or more icons 2020a, 2020b, and 2020c may indicate applications of high use frequency.

More specifically, the mobile terminal may switch the display to the enlarged display mode through the above-described embodiments. The mobile terminal may determine content output in the extended display region 2010. The mobile terminal may output a home screen or a preset application in the extended display region 2010.

In an embodiment of the present disclosure, the one or more icons 2020a, 2020b, and 2020c may be output in the extended display region 2010. The one or more icons 2020a, 2020b, and 2020c may correspond to indicators for executing applications of high use frequency when the user executes the enlarged display mode.

Therefore, the mobile terminal may output the icons 2020a, 2020b, and 2020c for executing frequently used applications in the extended display region 2010 when the user executes the enlarged display mode.

While the drawings have been separately described for convenience of description, it is also possible to design new embodiments to be implemented by integrating the embodiments described in respective drawings.

Figure 21:
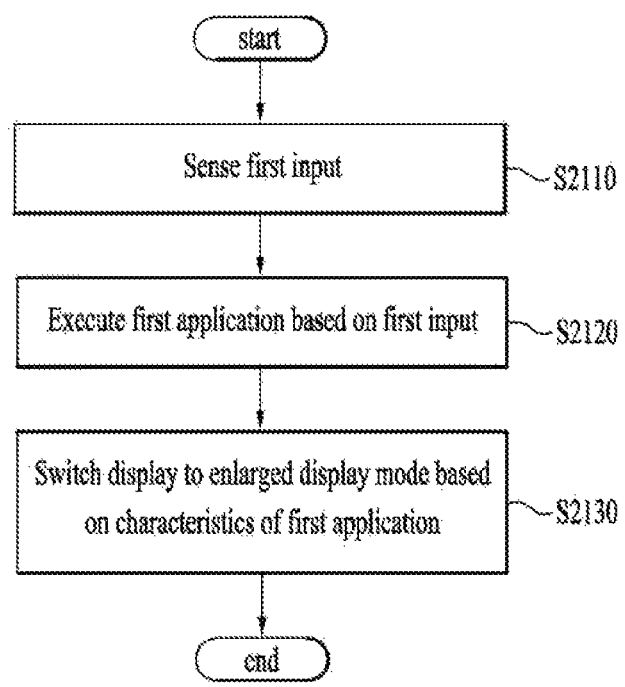
FIG. 21 is a flowchart illustrating an embodiment of being switched to an enlarged display mode in a mobile terminal according to an embodiment of the present disclosure.

FIG. 21 is a flowchart illustrating an embodiment of being switched to an enlarged display mode in a mobile terminal according to an embodiment of the present disclosure. Each step of FIG. 21 described below may be controlled by the controller of FIG. 1.

In step S2110, the mobile terminal may sense first input through an input unit. The first input may correspond to a touch input signal for executing an application. The first input may include an instruction for switching a display of the mobile terminal to the enlarged display mode. Accordingly, when a first application is executed according to the sensed first input, the display may be switched to the enlarged display mode.

In step S2120, the first application may be executed according to the sensed first input.

In step S2130, the display may be switched to the enlarged display mode based on characteristics of the first application. In an embodiment of the present disclosure, the characteristics of the application may include user input frequency.

More specifically, when the user input frequency of the first application exceeds a preset value, the first application may be output in a first region. The first region of the extended display may correspond to a region close to the hand of the user.

The region close to the hand of the user may correspond to a region sensed mainly by the hand of the user in the display. For example, when the display is switched to the enlarged display mode, if the display is extended in a vertical direction, the first region of the extended display may correspond to a lower region of the extended display.

If the user input frequency of the first application does not exceed the preset value, the first application may be output in a second region of the extended display. The second region of the extended display may correspond to a region which is far separated from the hand of the user. For example, when the display is switched to the enlarged display mode, if the display is extended in a vertical direction, the second region of the extended display may correspond to an upper region of the extended display.

The embodiments described above with reference to FIGS. 10 to 20 may be performed as the control method of the mobile terminal as illustrated in FIG. 21.

Effects of the mobile terminal according to the present disclosure and the control method therefor are as follows.

According to at least one of the embodiments of the present disclosure, when an application that requires user input is executed, a screen is extended in a downward direction favorable for user input so that the user may easily perform input.

According to at least one of the embodiments of the present disclosure, when an application that does not require user input is executed, the screen is extended in an upper direction in which the screen is not disturbed by the hand of the user so that the user may easily enjoy the application.

According to at least one of the embodiments of the present disclosure, the direction of the extended display is set according to a grip direction of the user so that the user may seamlessly use an application.

According to at least one of the embodiments of the present disclosure, icons of applications which are frequently used by the user are displayed in the extended screen, so that the frequently used applications may be easily executed.

The above-described present disclosure may be implemented as computer-readable code on a computer-readable medium in which a program is recorded. The computer-readable medium may be any type of recording device in which data that may be read by a computer system is stored. Examples of the computer-readable medium include a hard disk drive (HDD), a solid state drive (SSD), a silicon disk drive (SDD), a read only memory (ROM), a random access memory (RAM), a compact disc (CD)-ROM, a magnetic tape, a floppy disk, an optical data storage, and a carrier wave (e.g., data transmission over the Internet). The computer may include the controller 180 of the terminal. It will be apparent to those skilled in the art that various modifications and variations may be made in the present disclosure without departing from the spirit or scope of the disclosure. The above detailed description is therefore to be construed in all aspects as illustrative and not restrictive. The scope of the present disclosure should be determined by reasonable interpretation of the appended claims and all changes coming within the equivalency range of the present disclosure are intended to be included in the scope of the present disclosure.

The present disclosure is industrially applicable to a mobile terminal and is repeatedly applicable.

What is claimed is:

1. A mobile terminal comprising:
   a body including a first frame and a second frame;
   an extendable display coupled to the body such that a display region viewable at a front of the body is variable according to switching between an enlarged display mode and a reduced display mode, wherein the enlarged display mode corresponds to a mode when the second frame is extended and includes an extended display area of the extendable display that is not visible in the reduced display mode;
   an input unit configured to receive user input; and
   a controller configured to:
   control switching of the extendable display to the enlarged display mode according to receiving a first input via the input unit;
   determine a grip method of a user based on a location of the received user input, wherein the switching of the extendable display from the reduced display mode to the enlarged display mode is controlled based on the determined grip method of the user;
   cause the extendable display to display content in a left region of the extended display area based on the determined grip method corresponding to a right hand of the user and in response to the switching of the extendable display from the reduced display mode to the enlarged display mode;
   execute a first application according to the received first input and to control switching of the extendable display from the reduced display mode to the enlarged display mode based on characteristics of the first application comprising user input frequency,
   cause the extendable display to display the first application in a first region of the extended display area based on the user input frequency of the first application exceeding a preset value, and cause the extendable display to display the first application in a second region of the extended display area based on the user input frequency of the first application not exceeding the preset value.

2. The mobile terminal of claim 1, wherein the controller is further configured to execute a second application according to receiving a second input comprising a touch drag input, and wherein a display location of the executed second application is determined based on a dragged length of the second input.

3. The mobile terminal of claim 1, wherein the controller is further configured to cause the extendable display to display an alarm window in the extended display area, and to cause a display of a first mode of a third application corresponding to the alarm window on the extended display area according to receiving a third input for the alarm window.

4. The mobile terminal of claim 3, wherein the controller is further configured to cause the extendable display to stop displaying the first mode according to receiving a fourth input of a first direction for the first mode, and to cause the extendable display to display a second mode of the third application in the extended display area according to receiving a fifth input of a second direction for the first mode.

5. The mobile terminal of claim 1,
wherein the controller is further configured to cause the extendable display to display at least one indicator according to receiving a sixth input, and
wherein the at least one indicator indicates a layout of content displayed during switching of the extendable display to the enlarged display mode.

6. The mobile terminal of claim 1, wherein the switching of the extendable display to the enlarged display mode is further controlled according to a preset gesture.

7. The mobile terminal of claim 1,
wherein the controller is further configured to cause the extendable display to display at least one icon in the extended display area based on switching the extendable display from the reduced display mode to the enlarged display mode, and
wherein the at least one icon indicates an application with a use frequency that exceeds a preset threshold.

8. The mobile terminal of claim 1, wherein the body includes a first frame and a second frame such that the second frame is extendable or retractable with respect to the first frame.

9. The mobile terminal of claim 8, wherein the controller is further configured to operate in the enlarged display mode based on an extension of the second frame with respect to the first frame and to operate in the reduced display mode based on a retraction of the second frame with respect to the first frame.

10. The mobile terminal of claim 9,
wherein the extendable display comprises a flexible display encompassing the front, a side, and a rear of the body, and wherein the controller is further configured to control movement of a display portion positioned at the side of the body to the front of the body based on an extension of the second frame with respect to the first frame and to control movement of a display portion positioned at the rear of the body to the front of the body via the side of the body based on the extension of the second frame with respect to the first frame.

11. The mobile terminal of claim 10, wherein the controller is configured to control movement of a display portion positioned at the front of the body to the side of the body or to the rear of the body via the side of the body based on a retraction of the second frame with respect to the first frame.

12. The mobile terminal of claim 8, further comprising a driving unit configured to extend or retract the second frame with respect to the first frame.

13. A method of controlling a mobile terminal, the method comprising:
receiving a touch input;
executing an application according to the received touch input;
switching an extendable display to an enlarged display mode from a reduced display mode according to characteristics of a first application, wherein the enlarged display mode corresponds to a mode when a second frame is extended and includes an extended display area of the extendable display that is not visible in the reduced display mode, wherein the second frame is comprised in a body of the mobile terminal along with a first frame;
determining a grip method of a user based on a location of the received touch input, wherein the switching of the extendable display from the reduced display mode to the enlarged display mode is controlled based on the determined grip method of the user;
displaying content in a left region of the extended display area based on the determined grip method corresponding to a right hand of the user and in response to the switching of the extendable display from the reduced display mode to the enlarged display mode;
executing a first application according to the received first input and to control switching of the extendable display from the reduced display mode to the enlarged display mode based on characteristics of the first application comprising user input frequency;
displaying, on the extendable display, the first application in a first region of the extended display area based on the user input frequency of the first application exceeding a preset value; and
displaying, on the extendable display, the first application in a second region of the extended display area based on the user input frequency of the first application not exceeding the preset value.

* * * * *